(12) United States Patent
Grossberg et al.

(10) Patent No.: US 7,151,801 B2
(45) Date of Patent: Dec. 19, 2006

(54) METHOD AND SYSTEM FOR ENHANCING DATA QUALITY

(75) Inventors: Michael D. Grossberg, New York, NY (US); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 32 days.

(21) Appl. No.: 10/508,820

(22) PCT Filed: Mar. 25, 2003

(86) PCT No.: PCT/US03/09366

§ 371 (c)(1),
(2), (4) Date: Apr. 18, 2005

(87) PCT Pub. No.: WO03/084207

PCT Pub. Date: Oct. 9, 2003

(65) Prior Publication Data

US 2006/0003328 A1    Jan. 5, 2006

Related U.S. Application Data

(60) Provisional application No. 60/367,324, filed on Mar. 25, 2002.

(51) Int. Cl.
 *H04N 7/12* (2006.01)
(52) U.S. Cl. ............. 375/240.27; 375/240; 375/240.26
(58) Field of Classification Search ................ 375/240, 375/240.01, 240.12, 240.26, 240.27
See application file for complete search history.

(56) References Cited

U.S. PATENT DOCUMENTS

| | | | |
|---|---|---|---|
| 6,269,175 B1 | 7/2001 | Hanna et al. | ................ 382/107 |
| 7,006,576 B1 * | 2/2006 | Hannuksela | ........... 375/240.27 |

* cited by examiner

*Primary Examiner*—Allen Wong
(74) *Attorney, Agent, or Firm*—Baker Botts LLP

(57) ABSTRACT

The quality (e.g., resolution) of image data, video data, and sound data representing a scene or signal is enhanced by a quality enhancement function trained on high quality and low quality representations of a portion of the same scene or signal. The enhancement function is thus optimized to the most relevant input. A training algorithm uses low quality image of a scene or scene portion, along with a high quality image of the same scene or scene portion, to optimize the parameters of a quality enhancement function. The optimized enhancement function is then used to enhance other low quality images of the scene or scene portion. Sound data is enhanced by using a low resolution sample of a portion of a signal, and a high resolution sample of the same signal portion, to train a quality enhancement function which is then used to enhance the remainder of the signal.

38 Claims, 16 Drawing Sheets

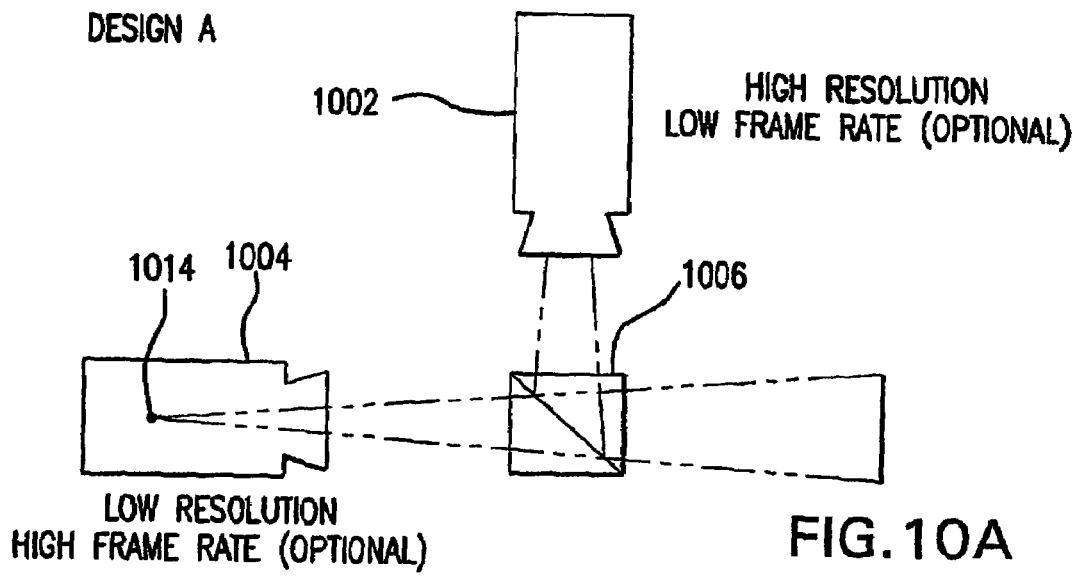
FIG. 10A
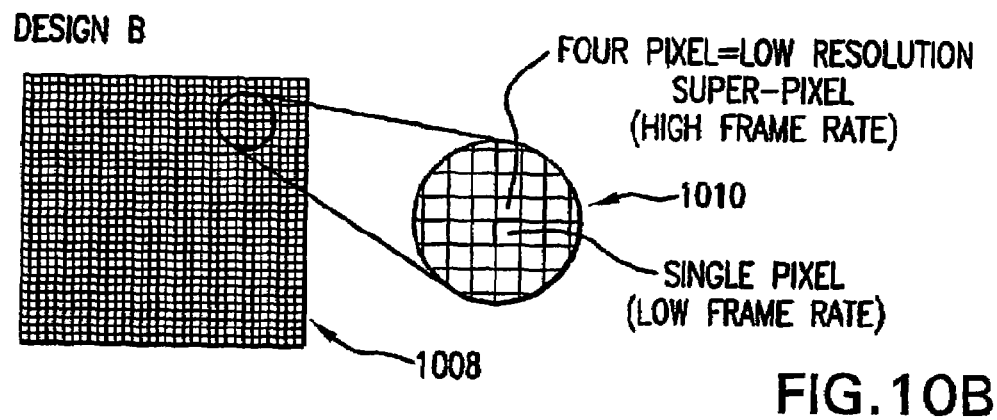
FIG. 10B
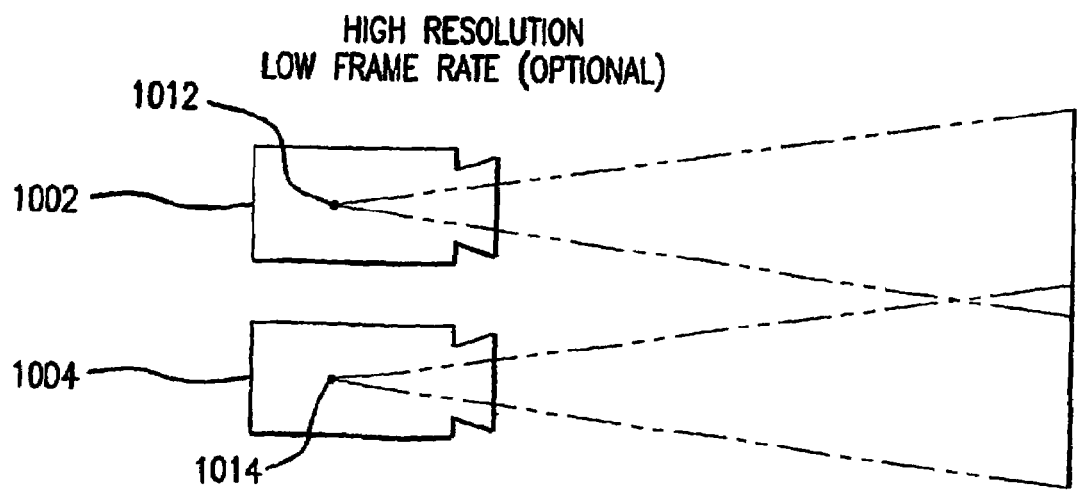

MULTI-SPECTRAL VIDEO
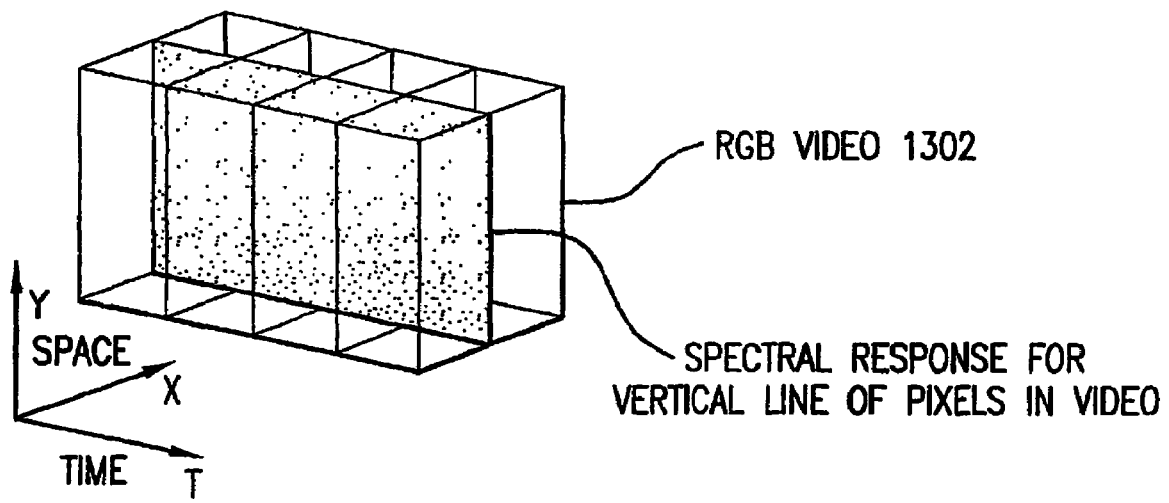
- RGB VIDEO 1302
- SPECTRAL RESPONSE FOR VERTICAL LINE OF PIXELS IN VIDEO
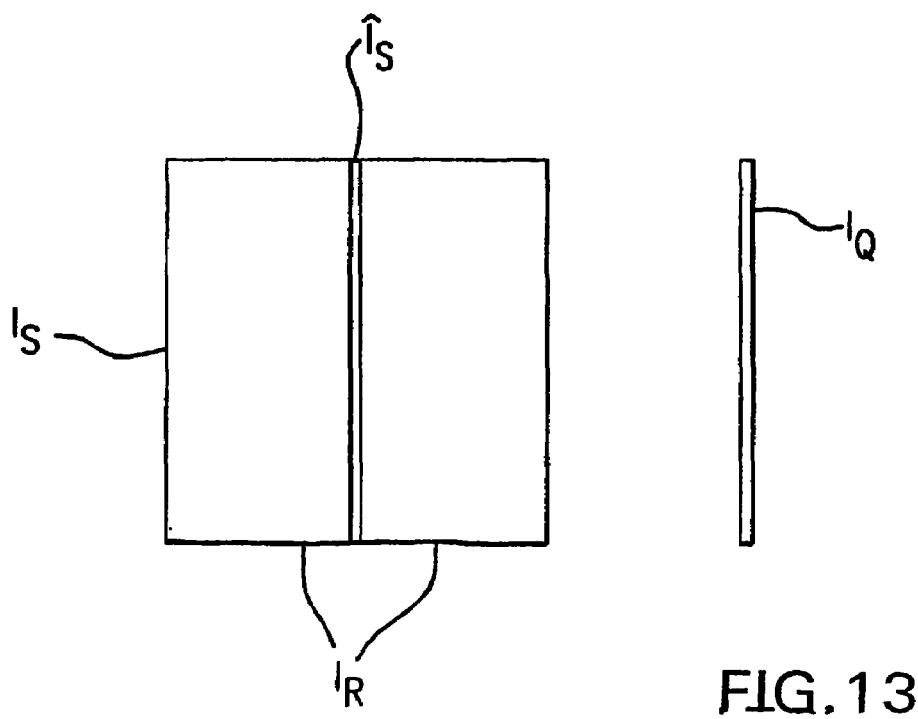
FIG. 13

METHOD AND SYSTEM FOR ENHANCING DATA QUALITY

CROSS REFERENCE TO RELATED APPLICATION

This application claims priority to U.S. Provisional Patent Application Ser. No. 60/367,324, entitled "Enhanced Imaging Using Self-Training Sensors," filed on Mar. 25, 2002, which is incorporated herein by reference in its entirety.

STATEMENT REGARDING FEDERALLY SPONSORED RESEARCH OR DEVELOPMENT

This invention was made with support in part from the U.S. Government under National Science Foundation Research Award No. IIS-00-85864. Accordingly, the U.S. Government may have certain rights in this invention.

BACKGROUND OF THE INVENTION

An imager, such as a video or still camera, images a scene by receiving and detecting light emanating from the scene. The incoming light signal from a particular point in the scene has characteristics, such as an intensity, a wavelength spectrum, and a polarization. In addition, the entire light field received by the imager varies with the angle at which the light is received by the imager. Of course, the angle at which a particular light ray or light ray bundle is received depends upon the location of the scene point from which the light emanated.

A number of applications require precise and accurate measurement of the light field. For example, in Imaged Based Rendering (IBR), a scene is imaged and then re-rendered to simulate navigation around the scene. Measurement of the entire light field with respect to both space and direction allows extraction of the geometric structure of the scene. As another example, light reflected from each material and emanating from each illumination source has its own characteristic spectral curve and polarization characteristics. With high spectral resolution it is possible to identify different types of material and illumination, and/or to re-render the scene under different, simulated illumination. Measuring the polarization of light from a scene point provides further information regarding the type of material present at the scene point, and regarding the illumination incident on the scene point. Polarization information has also been used to compensate for the effects of weather conditions when rendering outdoor scenes, and to help measure depth—i.e., the distance of a scene point from the imager. As can be seen from the above examples, a system which precisely and accurately measures the light field has a variety of useful applications.

However, conventional imagers are limited in their intensity resolution, spectral resolution, and polarization resolution—i.e., their ability to resolve differences in intensity, wavelength, and polarization—and are also limited in their spatial resolution—i.e., their ability to resolve differences in the locations of respective scene points. For example, there currently exist digital still cameras capable of capturing high spatial resolution images. However, because of the amount of data involved, these cameras are not capable of producing high resolution video. On the other hand, inexpensive cameras exist that can capture video at 30 frames/second—a respectable temporal resolution. However, such video cameras provide only low spatial resolution. It is particularly difficult to design an imager having high time resolution and high spatial resolution. In addition to the engineering problems associated with high resolution in multiple dimensions, there are often fundamental physical problems. For example, low light conditions require longer exposure times, resulting in coarser temporal resolution and, accordingly, more blurring in imaging of moving objects.

One approach for addressing the above-described problems uses multiple sensors which are "co-located" (i.e., have the same viewpoint) to measure different aspects of the light field. For example, it is possible to co-locate a thermal imager, a range finder, and a visible-light camera. In some cases a multiple-sensor approach can overcome some of the physical limits imposed on single sensors, such as the trade-off between exposure and temporal resolution. However, such an approach requires additional imaging resources. In a situation in which the available resources are finite—e.g., in which there is a fixed number of pixels, a fixed amount of memory, and trade-offs between exposure and time—it is desirable to use these resources as efficiently as possible.

If the light field were simply an unrelated and arbitrary set of intensities, there would be little hope of a solution other than building bigger, faster, and more densely packed sensors. However, there is tremendous structure and redundancy in the light field. For example, when the viewpoint is shifted slightly, the view of the scene typically changes in predictable ways. In addition, the spectral response across a material of a single color will often be relatively uniform. Furthermore, the motions of objects in a scene are often regular and predictable. For example, most objects are rigid, and in many cases, objects tend to move at nearly constant velocities. All of these factors create great redundancies in the light field. As a result, it is usually not necessary to sample the light field at every point in its domain to reconstruct, approximate, or predict the light field.

To exploit the above-described redundancy in the light field, assumptions can be made regarding the structure of this redundancy. For example, interpolation and sampling theory uses assumptions about the regularity of a signal to recover the signal from a limited number of samples. As a particularly well-known example, the Nyquist theorem states that the maximum required signal sampling frequency is limited, provided that the signal being sampled is band limited—i.e., has frequency components within a finite range. In the context of images, the requirement of finite frequency range essentially translates to a limit on the permissible sharpnesses of discontinuities such as edges and corners. The functions used in the Nyquist theorem are trigonometric functions, but polynomials can also be used for interpolation of images. Simple examples include bilinear and bi-cubic interpolation. Unfortunately, the improvement possible from simple interpolation techniques is limited. In particular, the resolution increases provided by such techniques are typically rather modest. Moreover, since natural images often do not conform to the mathematical assumptions inherent in interpolation techniques, such methods can produce aesthetically unpleasant artifacts.

Sparsely sampling an image and interpolating the resulting data effectively acts as a low-pass filter. Accordingly, increasing the spatial resolution of an image can be expressed as a problem of "de-blurring" the image. Sharpening filters, such as Pseudo Inverse and Weiner Filters, have been used to invert Gaussian blur. Other previously used approaches include Bayesian analysis, interpolation along edges, adaptive filtering, wavelet analysis, fractal interpolation, projection on convex sets, variational methods, and level sets. Such approaches improve on basic interpolation, but because they only use local image structure or apply a hypothesized global prior to the behavior of the light field—i.e., an assumption regarding the regularity of the light field—their ability to exploit redundancies is somewhat limited.

Related to sampling and interpolation are techniques known as "super-resolution," in which relatively course sampling is performed multiple times to improve the effective resolution of the sampling. As with the above-described interpolation methods, super-resolution makes assumptions about the regularity of the light field, and has recently been shown to have theoretical limits.

Various multi-camera systems have been proposed for capturing light fields over wide areas. Such systems typically use interpolation image warping to fill in missing data. For example, in hybrid imaging, images are captured using multiple cameras with different characteristics—e.g., different frame rates or spatial resolutions. A larger part of the light field is filled in based on computed camera geometry, using a combination of interpolation and image warping.

An additional approach is based on texture synthesis and scene statistics. Rather than make mathematical assumptions about the structure of the redundancy in a light field, statistics or pattern analysis are used to model and exploit the redundancy. One technique uses correlations of pixels at different scales. Another approach is to "train" the model using a variety of different textures and a variety of different images of everyday scenes. In the training approach, the training algorithm should be capable of extracting and utilizing the redundancies in the image to improve the image and increase its resolution. If the domain of image types is very limited—such as in the well-known "hallucinating faces" method, in which high resolution images of human faces are synthesized from low-resolution data—training approaches can dramatically improve resolution. However, attempts to model broader domains typically encounter standard problems of machine learning. For example, if the model is trained on very specific domains, the model becomes over-fitted to the particular training data, resulting in poor generalization. For example, if a resolution-enhancement algorithm is trained on faces and then applied to buildings, the algorithm will tend to produce artifacts and low quality enhancement results. On the other hand, if the model is trained on a very broad domain of image types, it learns only very general redundancies that occur in most images. As a result, although a broadly trained model will provide some benefit for most domains, it will not provide extremely good results for any domain.

SUMMARY OF THE INVENTION

It is therefore an object of the present invention to provide a method and system which enhances the quality of data such as image data (e.g., video and still image data) and sound data while using hardware resources efficiently.

It is a further object of the present invention to provide such data quality enhancement in a manner which avoids undesirable side effects such as visually unpleasing artifacts.

It is a still further object of the present invention to provide data quality enhancement with good performance for a wide variety of different types of images, sounds, etc.

These and other objects are accomplished by a quality enhancement function which is trained on a sub-portion of the data set which will be enhanced. For example, the system can capture low quality image data from an entire scene and high quality image data from a narrow field of view of the scene. The high quality image data—which represents a sub-portion of the scene—and a corresponding sub-portion of the low quality image data—which represents the same sub-portion of the scene—are processed by a training algorithm which trains the quality enhancement function based on these sets of image data. In other words, the quality enhancement function has one or more parameters, and the training algorithm determines which values of these parameters are optimal for allowing the quality enhancement function to derive, from the sub-portion of the low quality data, a data set closely approximating the high quality image. Because the quality enhancement function is trained on high quality and low quality data drawn from the same scene as is represented by the entire low quality image—i.e., the very data that is to be enhanced—the enhancement function is optimized to the most relevant data set. After training, the quality enhancement function is used to enhance the remaining low quality data. The system thus provides the benefits of learning-enhanced imaging without the drawbacks (e.g., poor performance with new domains) associated with conventional systems.

The above-described procedure is not limited to image data, but can also be applied to audio (i.e., sound) data. To enhance a sampled audio signal, a low quality data set representing the signal is captured, along with a high quality data set representing a sub-portion of the same signal. The high quality data set representing the sub-portion of the signal and the corresponding portion of the low-quality data set are processed by a training algorithm which determines optimum, learned values of one or more parameters of a quality enhancement function. The learned parameters are selected such that the quality enhancement function is operable to derive, from the relevant portion of the low quality data set, a data set closely approximating the high quality data set. Once the training has been performed, the quality enhancement function is used to enhance the remaining low quality data.

In accordance with an additional aspect of the present invention, a sequence of images having varying quality can be used to train a quality enhancement function which will then be used to enhance low quality images in the sequence. A high resolution image of a scene and a low resolution image of the same scene are processed by a training algorithm to determine learned values of one or more parameters of a quality enhancement function. The learned values of the parameters are selected such that, with those parameter values, the quality enhancement function is operable to derive from the low quality image an image closely approximating the high quality image. Once the parameters of the quality enhancement function have been learned, the quality enhancement function is used to process additional low quality images of the same scene to derive higher quality images.

BRIEF DESCRIPTION OF THE DRAWINGS

Further objects, features, and advantages of the present invention will become apparent from the following detailed description taken in conjunction with the accompanying figures showing illustrative embodiments of the present invention, in which:

FIG. 10A is a diagram illustrating a still further system for enhancing quality of image data in accordance with the present invention;

FIG. 10B is a diagram illustrating yet another system for enhancing quality of image data in accordance with the present invention;

FIG. 13 is a diagram illustrating exemplary video and still image data to be processed in accordance with the present invention;

Throughout the drawings, unless otherwise stated, the same reference numerals and characters are used to denote like figures, elements, components, or portions of the illustrated embodiments.

DETAILED DESCRIPTION OF THE INVENTION

In accordance with the present invention, data quality can be enhanced by performing low quality and high quality sampling of the same scene or signal to generate data having a low amount of quality as well as corresponding data having a high amount of quality. The low quality data and the corresponding high quality data—which both represent the same portion of the scene or signal—are used to train a data enhancement function which can then be used to enhance the quality of additional low quality data representing the remainder of the scene or the signal. The term "amount of quality" as used herein can, for example, refer to the spatial resolution of data, but need not be limited to spatial resolution. "Quality" can, in fact, be any characteristic related to the precision and/or accuracy with which the data represents a scene, a light field, an audio signal, etc. For example, an amount of quality can be an intensity resolution (e.g., a number of bits per pixel), a spectral resolution (e.g., the number of different spectral components into which light or other radiation has been resolved), a polarization resolution (e.g., how precisely the polarization components of light or other radiation can be resolved), a temporal resolution (e.g., a number of video frames per second or audio samples per second), a signal level resolution (e.g., a number of bits per sample in an audio data stream), and/or a signal-to-noise ratio. An amount of quality can also refer to, for example, the following attributes of an image: the accuracy with which edges appearing in the image represent the actual locations of the edges of objects in a scene, the accuracy with which the image represents the actual colors present in an incoming light field; and/or the accuracy with which the brightness contrast or color contrast of the incoming light field is represented in the image.

Figure 1:
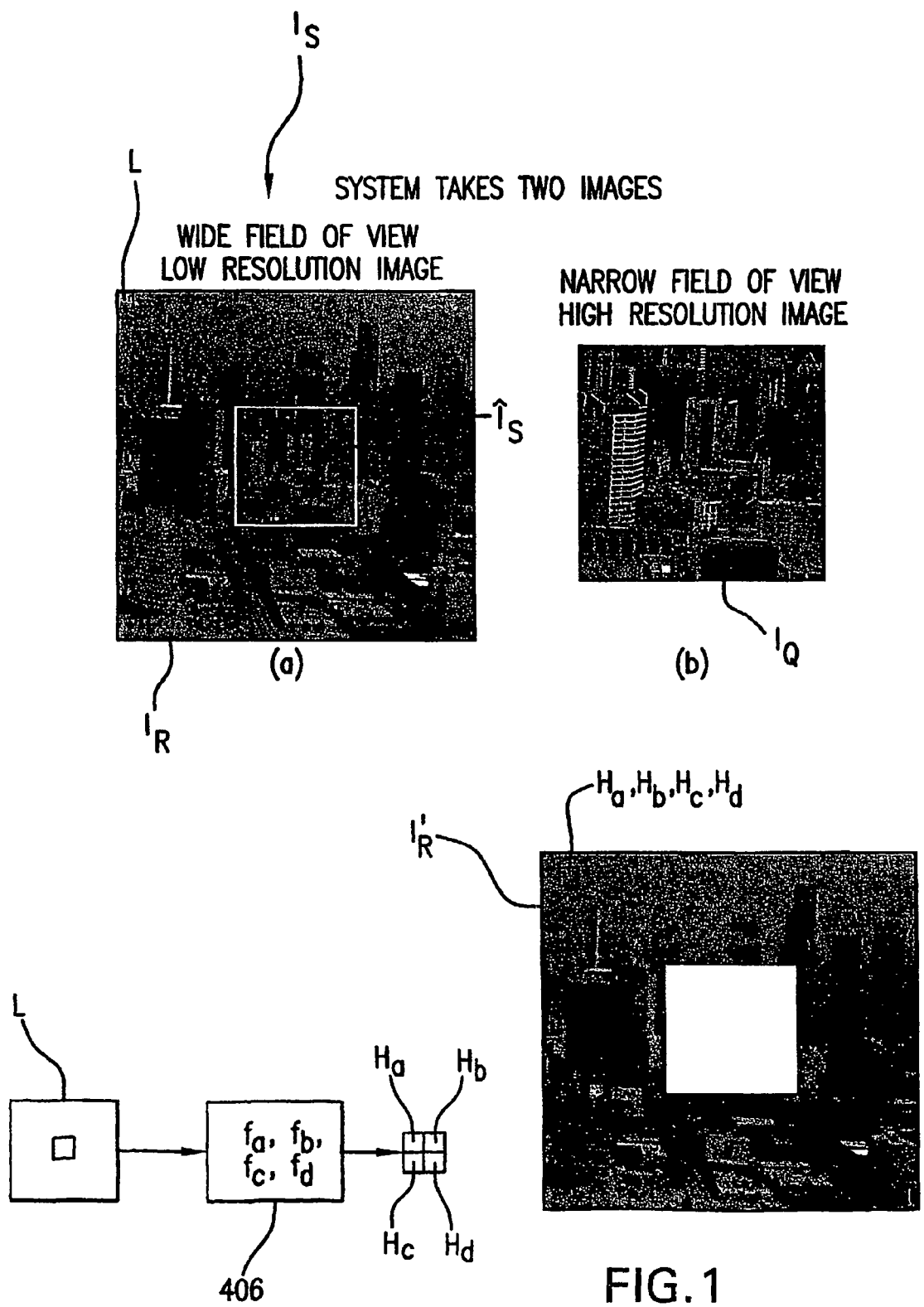
FIG. 1 is a diagram illustrating exemplary image data to be processed in accordance with the present invention.
Figure 2:
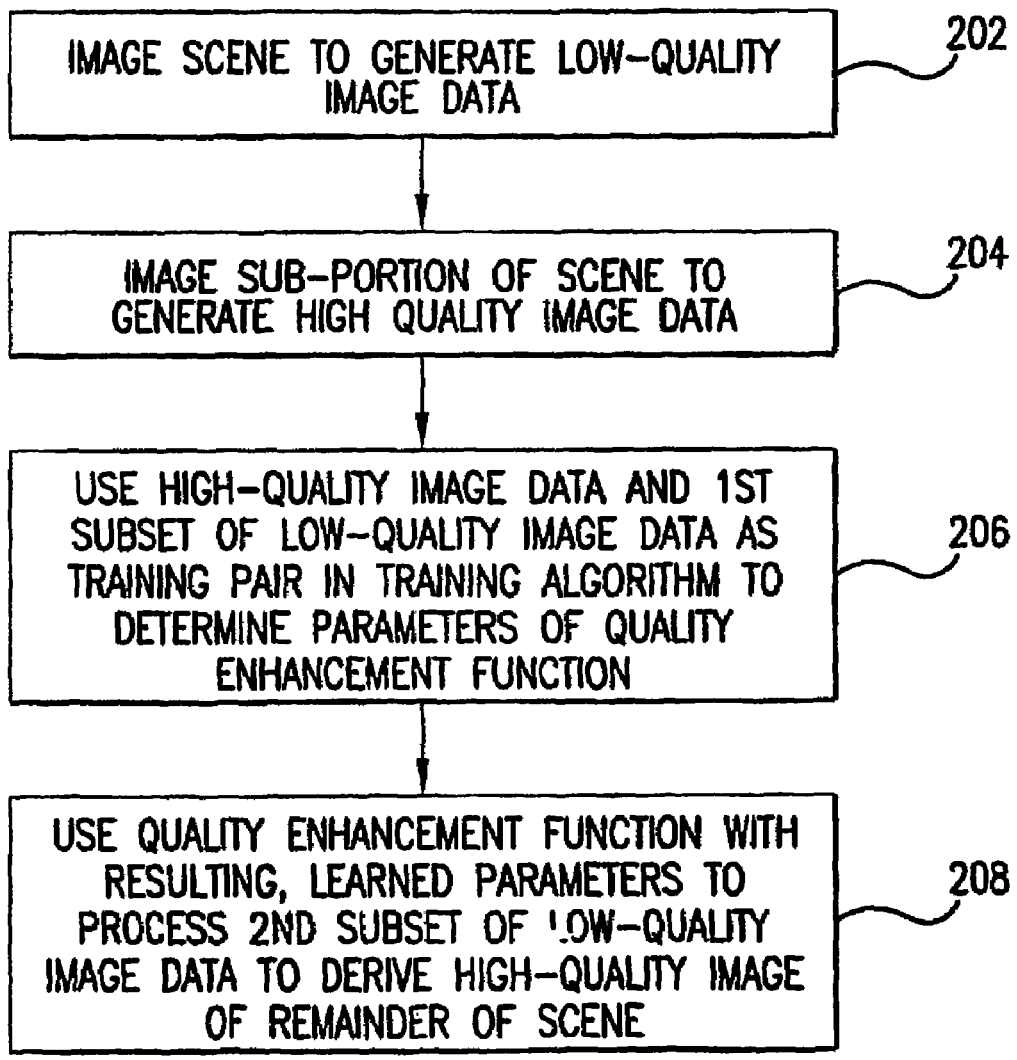
FIG. 2 is a flow diagram illustrating an exemplary procedure for enhancing quality of image data in accordance with the present invention.
Figure 4:
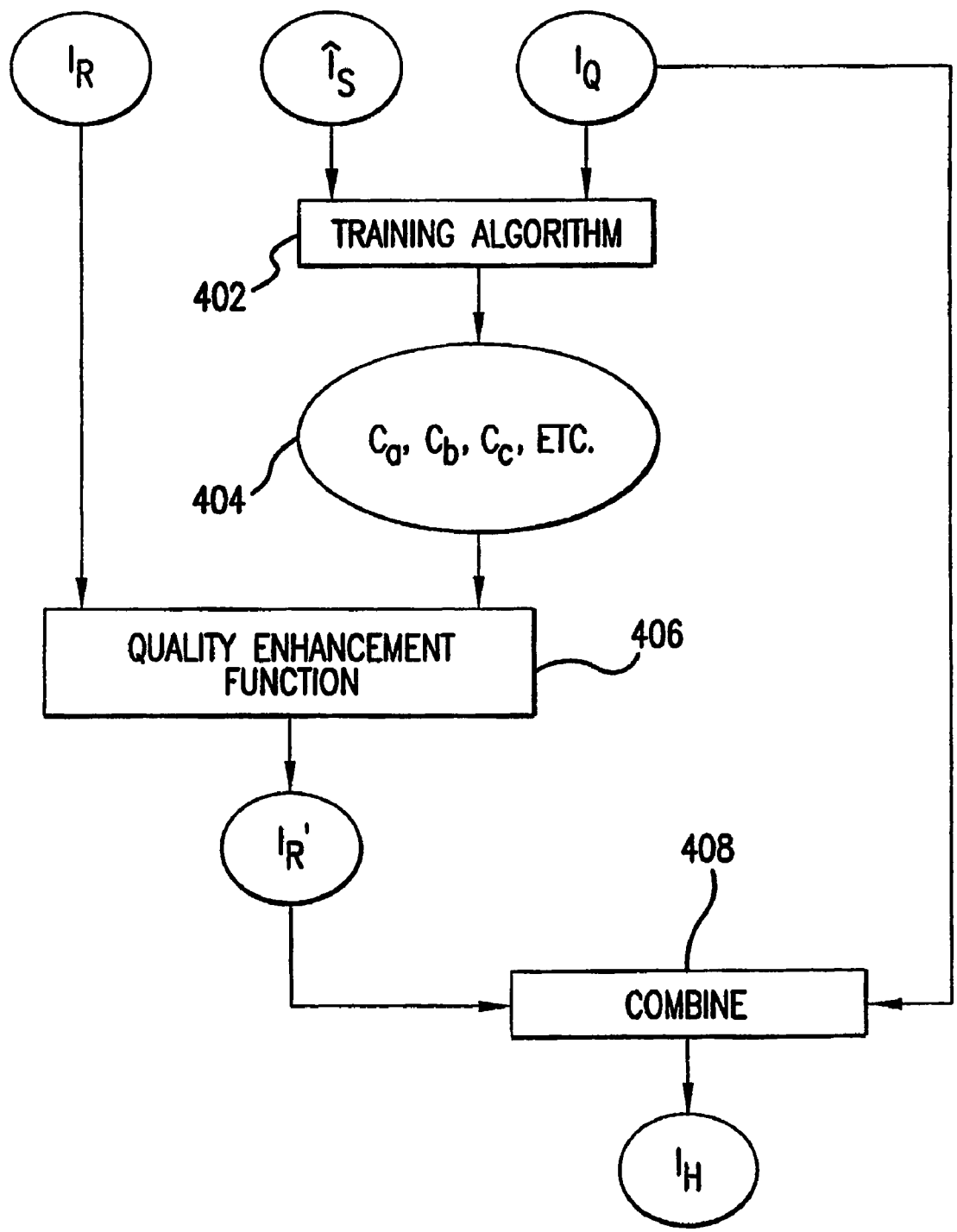
FIG. 4 is a block diagram illustrating an exemplary procedure for enhancing quality of image data in accordance with the present invention.

FIGS. 2 and 4 illustrate an exemplary procedure for enhancing quality of image data in accordance with the present invention. In the illustrated procedure, a scene is imaged to generate an image of the scene having a low amount of quality (step 202). A sub-portion of the scene is imaged to generate high-quality image data—i.e., data having a greater amount of quality than the data generated in step 202 (step 204). Exemplary sets of image data thus generated are illustrated in FIG. 1. The illustrated data sets include a low spatial resolution, 384×384 pixel image $I_S$ of a wide field of view of the scene, and a high spatial resolution, 256×256 pixel image $I_Q$ of a narrow field of view of the scene. The middle 128×128 pixel subset of $I_S$, denoted $\hat{I}_S$ (outlined by the white square in the drawing), corresponds to a lower spatial resolution version of high spatial resolution image $I_Q$. The term "spatial resolution" can, for example, refer to the number of pixels per unit area on a plane at unit depth via perspective projection. Accordingly, although image $I_Q$ has fewer total pixels than image $I_S$, image $I_Q$ has a higher resolution than $I_S$. Optionally, low resolution data set $\hat{I}_S$ can be obtained by selecting a portion of the entire low resolution image $I_S$ or by degrading the higher resolution image $I_Q$ to the resolution of the low resolution image $I_S$. For example, a Gaussian blur kernel for averaging can be applied to the high resolution data, followed by sub-sampling to simulate a low resolution image. A typical Gaussian blur kernel is a square (e.g., 9×9) matrix of elements whose values are based on a normalized, 2-dimensional Gaussian function $G=K \exp((-x^2-y^2)/\sigma^2)$, where K and $\sigma$ are constants and x and y are the horizontal and vertical coordinates, respectively. An image is blurred by calculating a new value for each pixel, the new value being a weighted average of all of the pixels in a square neighborhood (e.g., a 9×9 neighborhood) surrounding the pixel in question. To calculate the weighted average, each of the values of the respective pixels in the neighborhood is multiplied by the corresponding element of the blur kernel, and the resulting products are added. The resulting sum of the products becomes the new value of the center pixel. Each pixel of the image is individually processed by the above-described procedure to generate a new, blurred image.

The high quality data $I_Q$ and the corresponding subset $\hat{I}_S$ of the low quality image $I_S$ are processed (in step 206) by a training algorithm 402 to determine learned values 404 of one or more parameters of a quality enhancement function 406, such that if the learned parameters 404 are used in the quality enhancement function 408, the function 408 is operable to derive a data set closely approximating the high quality data $I_Q$ from the subset $\hat{I}_S$ of the low-quality data $I_S$. Once the appropriate parameters of the quality enhancement function are learned, the resulting, optimized function can be used to process the remainder $I_R$ of the low quality data set $I_S$ to derive a data set $I_R'$ representing the remainder of the scene (step 208). The high quality data sets $I_Q$ and $I_R'$ can be combined (step 408) to derive a high quality image $I_H$ of the entire scene.

Figure 7:
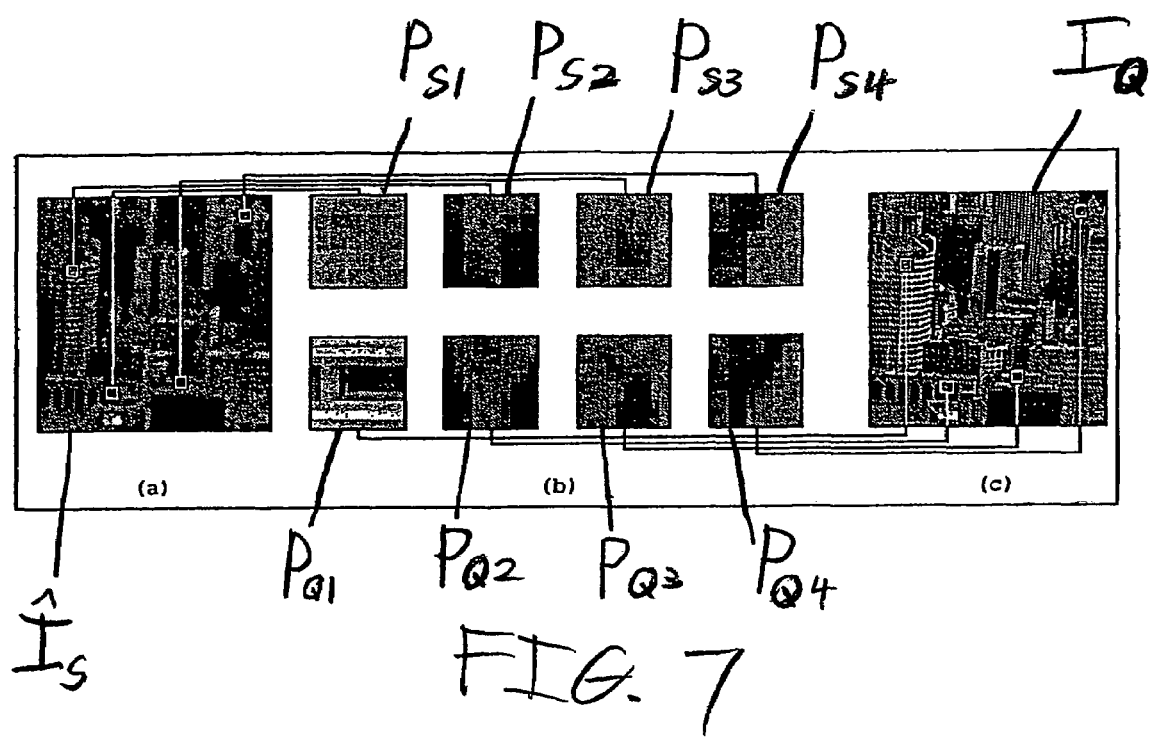
FIG. 7 is a diagram illustrating exemplary image data to be processed in accordance with the present invention.

Optionally, the low resolution data subset $\hat{I}_S$ and the high resolution data set $I_Q$ can be processed by selecting one or more "training pairs"—small portions taken from a variety of different regions in the sets of image data. FIG. 7 illustrates a number of training pairs that can be extracted from the low resolution and high resolution image data sets $\hat{I}_S$ and $I_Q$ illustrated in FIG. 1. The low resolution, 5×5 pixel image patches $P_{S1}$, $P_{S2}$, $P_{S3}$, and $P_{S4}$ illustrated in FIG. 7 have been taken from $\hat{I}_S$, and the corresponding high resolution, 10×10 pixel patches $P_{Q1}$, $P_{Q2}$, $P_{Q3}$, and $P_{Q4}$ have been taken from $I_Q$. The resulting pairs of image patches— $(P_{S1}, P_{Q1})$, $(P_{S2}, P_{Q2})$, $(P_{S3}, P_{Q3})$, and $(P_{S4}, P_{Q4})$—provide the training data for the training algorithm 402.

The quality enhancement function 406 is trained (in training algorithm 402) by applying polynomial regression to a set of training pairs $(P_{S1}, P_{Q1}), \ldots, (P_{SK}, P_{QK})$, where K represents the number of training pairs. First, the training algorithm 402 arranges the values of the 25 pixels of each low resolution patch $P_{Sn}$ to form a 25-element row vector $W_{Sn}$. The values of the 25 pixels can be arranged in any convenient order, but the same order is used for all patches. The vectors of the respective patches are then arranged into a matrix $W_S:=(W_{S1}^T, \ldots, W_{SK}^T)^T$ (where "T" denotes the transpose of a vector or matrix). If $W_{S1}$ is the vector representing the first low resolution, 5×5 patch $P_{S1}$, then let $z_i(W_{S1})$ (where i=1, ... 25) represent the value of ith pixel of that patch $P_{S1}$. In order to improve the efficiency of the training algorithm 402, the algorithm 402 preferably only considers degree-2 polynomials. Accordingly, let t be a list or vector of all the degree-2 and smaller monomials, including: (a) the value 1; (b) the values of the respective pixels; and (c) all possible degree-2 monomials that can be formed by multiplying the various pixels of the patch $P_{S1}$ with each other and with themselves:

$$t \equiv (t_1 \ldots, t_p) \equiv (1, z_1, \ldots, z_{25}, z_1^2, z_1 z_2, \ldots, z_{25}^2). \quad (1)$$

Figure 8:
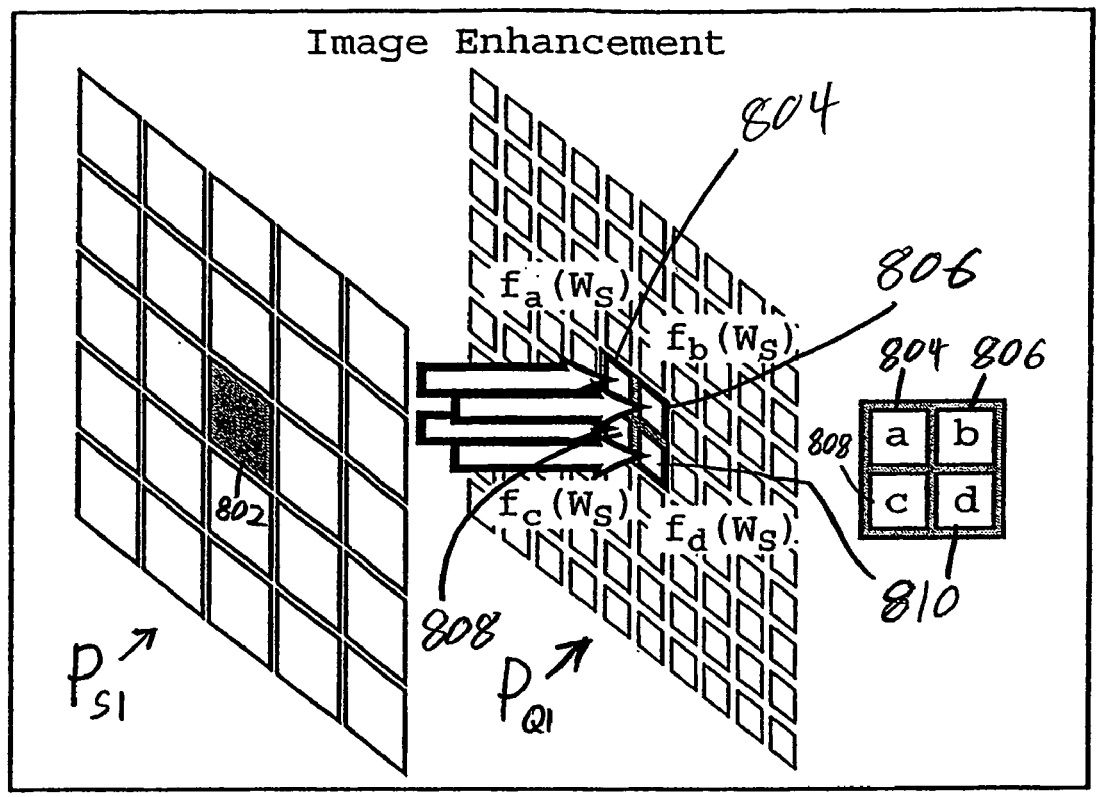
FIG. 8 is a diagram illustrating additional exemplary image data to be processed in accordance with the present invention.

For each low resolution patch, a row vector of these monomials is formed. For example, the row vector corresponding to patch $P_{S1}$ is $t(W_{S1}) := (t_1(W_{S1}), \ldots t_P(W_{S1}))$. If, as is illustrated in FIG. 8, the patch $P_{S1}$ has 25 pixels, the corresponding row vector $t(W_{S1})$ has 651 elements. The row vectors for the respective patches are arranged into a matrix:

$$t(W_S) \equiv (t(W_{S1})^T, \ldots t(W_{SK})^T)^T. \quad (2)$$

In the illustrated example, 4:1 enhancement of spatial resolution is being performed. Accordingly, each low resolution pixel in a given low resolution patch corresponds to four high resolution pixels in the corresponding high resolution patch. For example, as is illustrated in FIG. 8, pixel 802 in the 5×5 patch $P_{S1}$ corresponds to four pixels 804, 806, 808, and 810 in locations a, b, c, and d, respectively, within the corresponding high resolution patch $P_{Q1}$—each of the locations a, b, c, and d being defined in relation to the location of the pixel 802 in the middle of the low resolution patch $P_{S1}$. The values of high resolution pixels 804, 806, 808, and 810 can be denoted mathematically as $(W_{Q1})_a$, $(W_{Q1})_b$, $(W_{Q1})_c$, and $(W_{Q1})_d$, respectively. In the illustrated example, only the four middle pixels, 804, 806, 808, and 810 of the high resolution patch $P_{Q1}$ are used for training; the remaining pixels of the high resolution patch $P_{Q1}$ need not be used. Each function of a set of quality enhancement functions being trained will ultimately be used to operate on an entire low resolution patch—which can be viewed as a neighborhood of the pixel in the middle of the patch—to derive one of the four high resolution pixels which will replace the aforementioned low resolution pixel in middle of the neighborhood. For example, in the case of 4:1 spatial resolution enhancement based on a 5×5 low resolution neighborhood/patch, each of four separate resolution enhancement functions $f_a$, $f_b$, $f_c$ and $f_d$ operates on the entire low resolution patch to derive one of the four corresponding high resolution pixels in the four pixel locations a, b, c, and d. The training algorithm 402 operates on the principle that, if the quality enhancement functions $f_a$, $f_b$, $f_c$ and $f_d$ are properly optimized—i.e., if the coefficients of the functions are properly chosen—it should be possible to accurately derive a given high resolution pixel (e.g., pixel 804) from the values of all of the pixels in the low resolution patch (e.g., $P_{S1}$ illustrated in FIG. 8). The coefficients for a given pixel m (where m=a, b, c, or d) form a row vector $C_m = (c_{m1}, \ldots, c_{mK})^T$, wherein the values of the coefficients in $C_m$ depend on which high quality pixel is being derived— i.e., whether the pixel being derived is in location a, b, c, or d. In other words, each of the four high quality pixel locations a, b, c, and d has a different set of coefficients: $C_a$, $C_b$, $C_c$, and $C_d$, respectively, for functions $f_a$, $f_b$, $f_c$ and $f_d$. Preferably, multiple training pairs are used, each having a low resolution patch and four corresponding high resolution pixels in locations a, b, c, and d, respectively. Using the values—taken from all of the training pairs—that are associated with a given pixel location m, the values of the respective high quality pixels situated at that pixel location m can be arranged into a vector:

$$(W_Q)_m = ((W_{Q1})_m, \ldots, (W_{QK})_m)^T \quad (3)$$

for m=a, b, c, and d. For any one of these four pixel locations—i.e., for any given m—$C_m$ should solve the following matrix equation:

$$t(W_S)C_m = (W_Q)_m. \quad (4)$$

provided that the coefficients of $C_m$ have been correctly determined. Several well known linear algebra techniques exist for finding a solution to vector $C_m$ in matrix equations having the form of Eq. (4). For example, if $t(W_S)^T t(W_S)$ is invertible, then the training algorithm 402 can compute $C_m$ as follows:

$$C_m = (t(W_S)^T (W_S))^{-1} t(W_S)^T (W_Q)_m. \quad (5)$$

Eq. (5) provides the least squares solution for $C_m$ in Eq. (4)—i.e., provides the set of vector element values for $C_m$ that minimizes the sum of square differences between the left and right sides of Eq. (4).

In this example, the outputs of the learning phase are the four coefficient vectors $C_a$, $C_b$, $C_c$, and $C_d$. These vectors $C_a$, $C_b$, $C_c$, and $C_d$ thus contain the coefficients of the four polynomial enhancement functions $f_a$, $f_b$, $f_c$ and $f_d$, respectively, that can operate on any given 5×5 low resolution patch L to derive the four corresponding high resolution pixels $H_m$ in the middle of the neighborhood of that patch L, where:

$$H_m = f_m'(L) \equiv t(L)C_m \quad (6)$$

for m=a, b, c, and d. To enhance a low resolution image data set or subset, such as image subset $I_R$ illustrated in FIG. 1, the enhancement algorithm (step 208 in FIG. 2) typically starts by processing a first 5×5 patch L of the data set $I_R$ (e.g., the patch L in the upper left corner, as illustrated in FIG. 1)

to generate the four high resolution pixels $H_a$, $H_b$, $H_c$, and $H_d$ in the center of the corresponding neighborhood of high resolution image data set $I_R'$. The algorithm then processes the next patch by shifting over (e.g., to the right) by one low-resolution pixel to generate the adjacent set of four high resolution pixels. In other words, there is preferably an overlap area of, e.g., 4×5 pixels between the successive low resolution patches being processed, thus ensuring full coverage of the scene area in the resulting high resolution image data set $I_R'$. This overlap should exist in both the vertical and horizontal directions.

It is to be noted that, although the above discussion has emphasized the processing of data sets having different spatial resolutions, the procedures illustrated in FIGS. 2 and 4 can also be used to process data sets having different intensity resolutions (e.g., different numbers of gray levels and/or bits per pixel). Referring again to FIGS. 1, 2, and 4, if the low quality image $I_S$ is an image having low intensity resolution, and the high resolution image $I_Q$ is an image having high intensity resolution, the high resolution image $I_Q$ and the first subset $\hat{I}_S$ of the low resolution image $I_S$—both of which represent the same portion of the scene—are processed by a training algorithm 402 (step 206) to determine the parameters 404 of a quality enhancement function 406. The quality enhancement function 406 has thus been optimized and can therefore be used to enhance the resolution of the remaining subset $I_R$ of the low intensity resolution image $I_S$ to derive a high intensity resolution image $I_R'$ of the remainder of the scene (step 208). The high resolution images $I_Q$ and $I_R'$ can then be combined (step 408) to provide an improved image $I_H$ of the entire scene, which has higher intensity resolution than the initially captured low quality image $I_S$ of the scene.

Figure 9A:
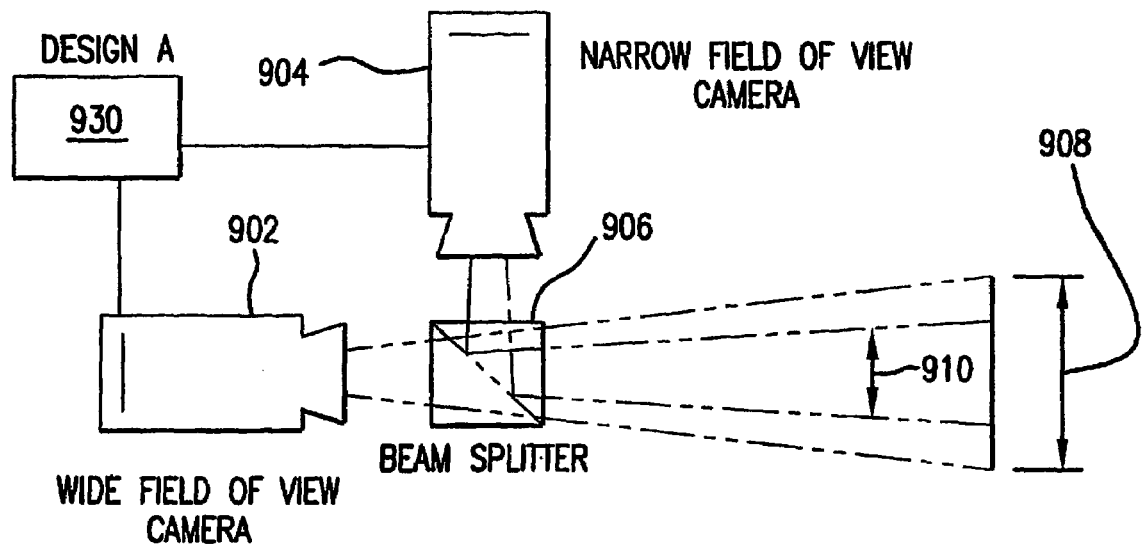
FIG. 9A is a diagram illustrating a system for enhancing quality of image data in accordance with the present invention.

FIG. 9A illustrates an exemplary system for collecting high and low quality data for enhancement in accordance with the present invention. The illustrated imaging system includes a first imager 902 having a relatively wide field of view 908 but relatively low quality (e.g., low spatial or intensity resolution), a second imager 904 having a narrower field of view 910 but high quality (e.g., high spatial or intensity resolution), and a beam splitter 906. The beam splitter 906 directs the incoming light to both the low quality imager 902 and the high quality imager 904, and these imagers 902 and 904 can be used to generate the low resolution image $I_S$ and the high resolution image $I_Q$ illustrated in FIG. 1. Optionally, the system can also include a processing arrangement 930—which can comprise, for example, a computer or special-purpose processing logic—for performing the data enhancement procedures discussed above with respect to FIGS. 1, 2, and 4. Alternatively, or in addition, the processing arrangement 930 can be incorporated into one or both of the imagers 902 and 904.

Figure 9B:
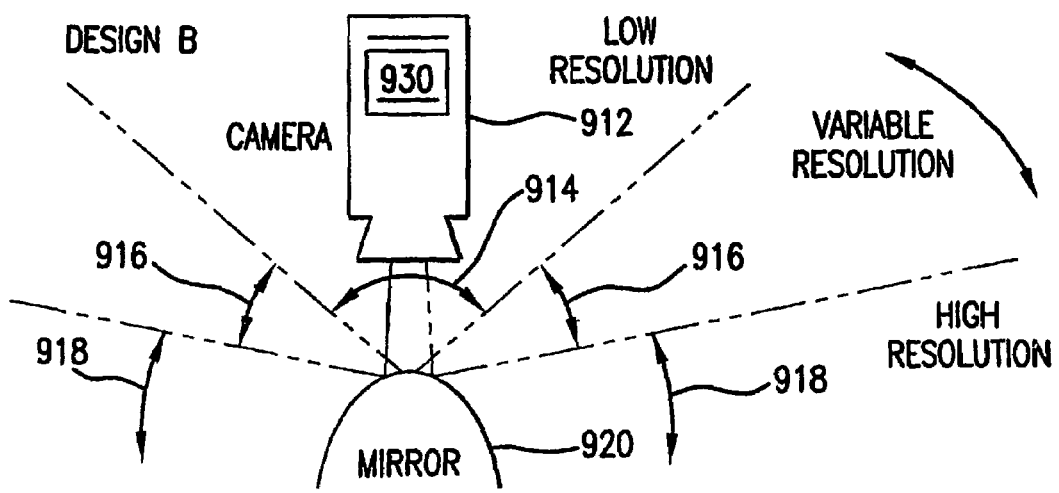
FIG. 9B is a diagram illustrating an additional system for enhancing quality of image data in accordance with the present invention.

FIG. 9B illustrates an additional exemplary system for generating image data for use in the training algorithm and quality enhancement procedure discussed above. The illustrated system includes a camera 912 and a curved mirror 920 which provides a wide angle view of the scene. The mirror 920—which can be, for example, a parabolic mirror—provides a low resolution field of view 914, a high resolution field of view 918, and an intermediate resolution field of view 916. The data collected from the high resolution field of view 918 and/or the intermediate resolution field of view 916 can be degraded to provide low resolution training data for use in conjunction with the originally captured high and medium resolution data. Optionally, a processing arrangement 930—as discussed above with respect to FIG. 9A—can be incorporated into the camera 912.

Figure 9C:
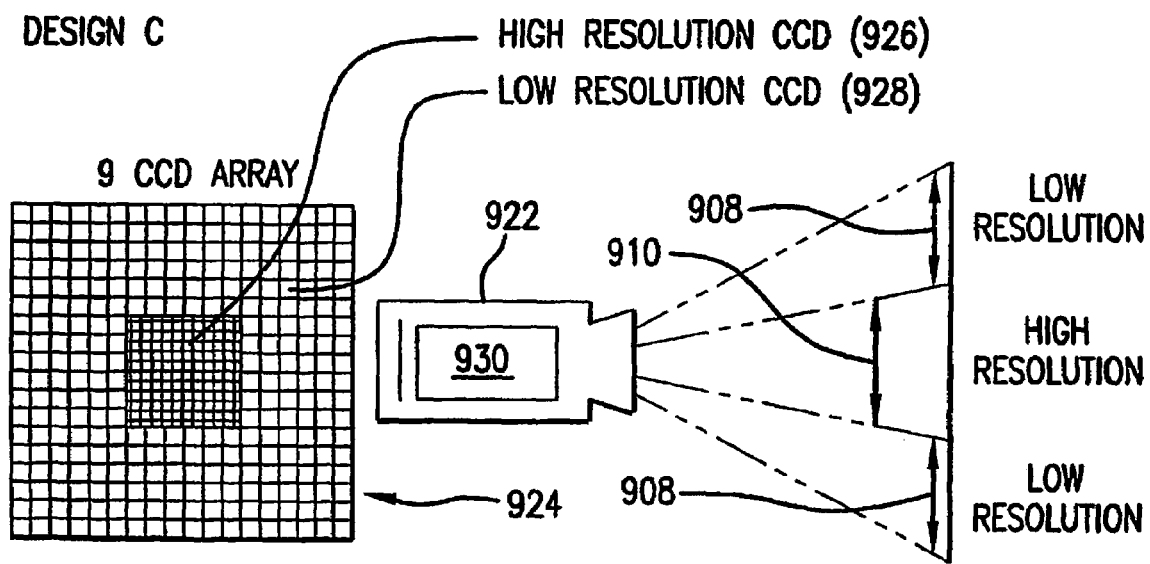
FIG. 9C is a diagram illustrating yet another system for enhancing quality of image data in accordance with the present invention.

FIG. 9C illustrates an additional example of a multi-resolution imaging system. The imaging system comprises a camera 922 having a CCD array 924 with a low resolution portion 928 and a high resolution portion 926. The high resolution portion 926 captures data within a high resolution field of view 910, whereas the low resolution portion 928 captures data from a low resolution field of view 908. Although the imager 922 does not directly capture low resolution data from the high resolution portion 910 of its field of view, the high resolution data collected from that portion 910 of the field of view can be downgraded as described above to derive low resolution training data for use in conjunction with the high resolution data collected by the high resolution portion 926 of the CCD array 924.

It is to be noted that, although the foregoing examples have emphasized the use of a training algorithm based on polynomial regression, the technique of training on low resolution data and high resolution data from the same scene is not limited to such a training algorithm. In fact, any training algorithm which uses regression to adjust the parameters of a data quality enhancement function can be used. Additional examples of suitable algorithms include the following well known training algorithms which will be familiar to those skilled in the art: Bayesian Decisions, Maximum Likelihood, Linear Discriminants, Neutral Networks, Genetic Programming, and Kernel Methods such as Support Vector Machines.

Figure 3:
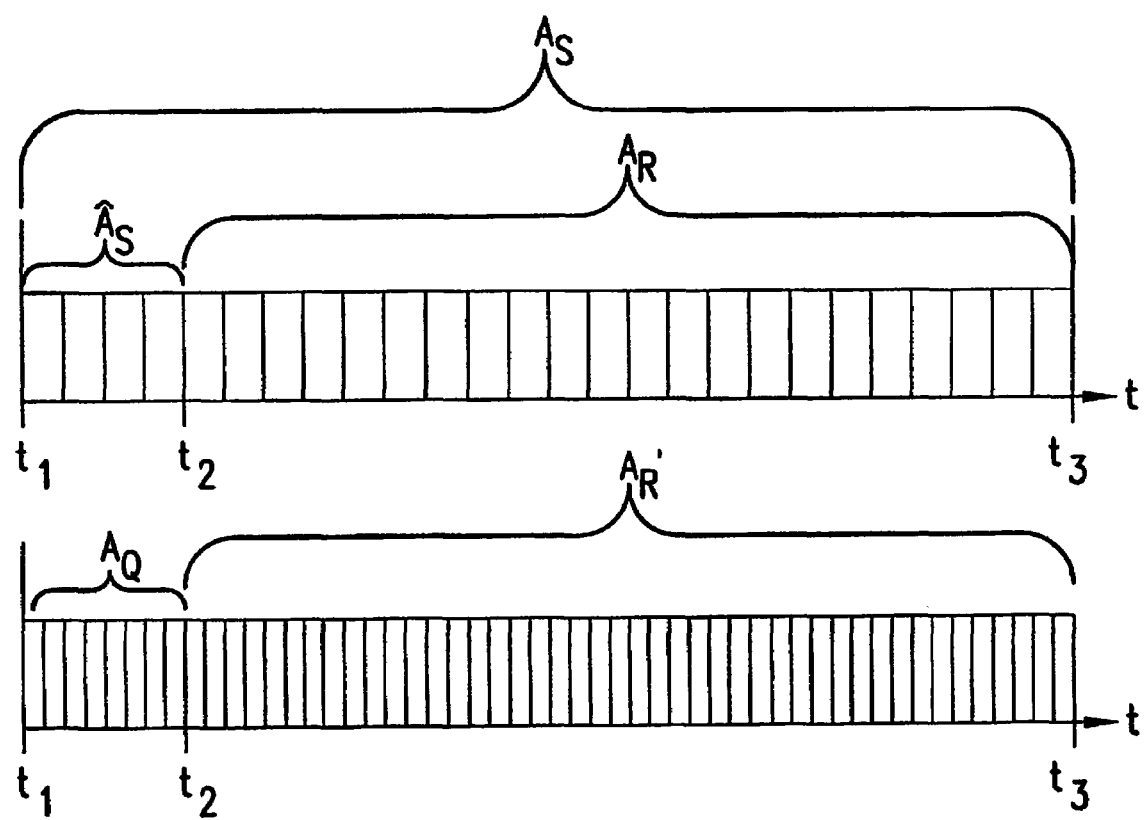
FIG. 3 is a diagram illustrating exemplary sound data to be processed in accordance with the present invention.
Figure 5:
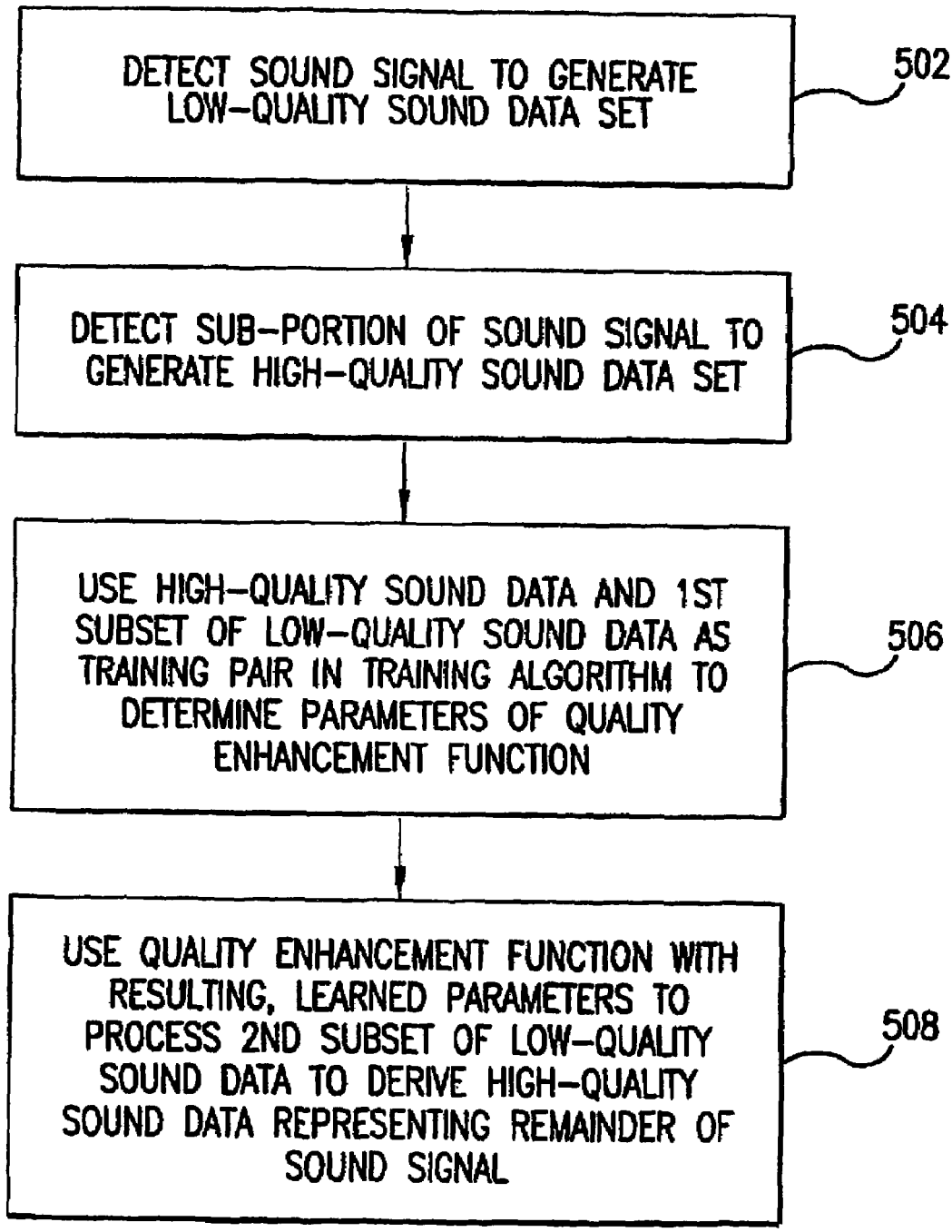
FIG. 5 is a flow diagram illustrating an exemplary procedure for enhancing quality of sound data in accordance with the present invention.
Figure 6:
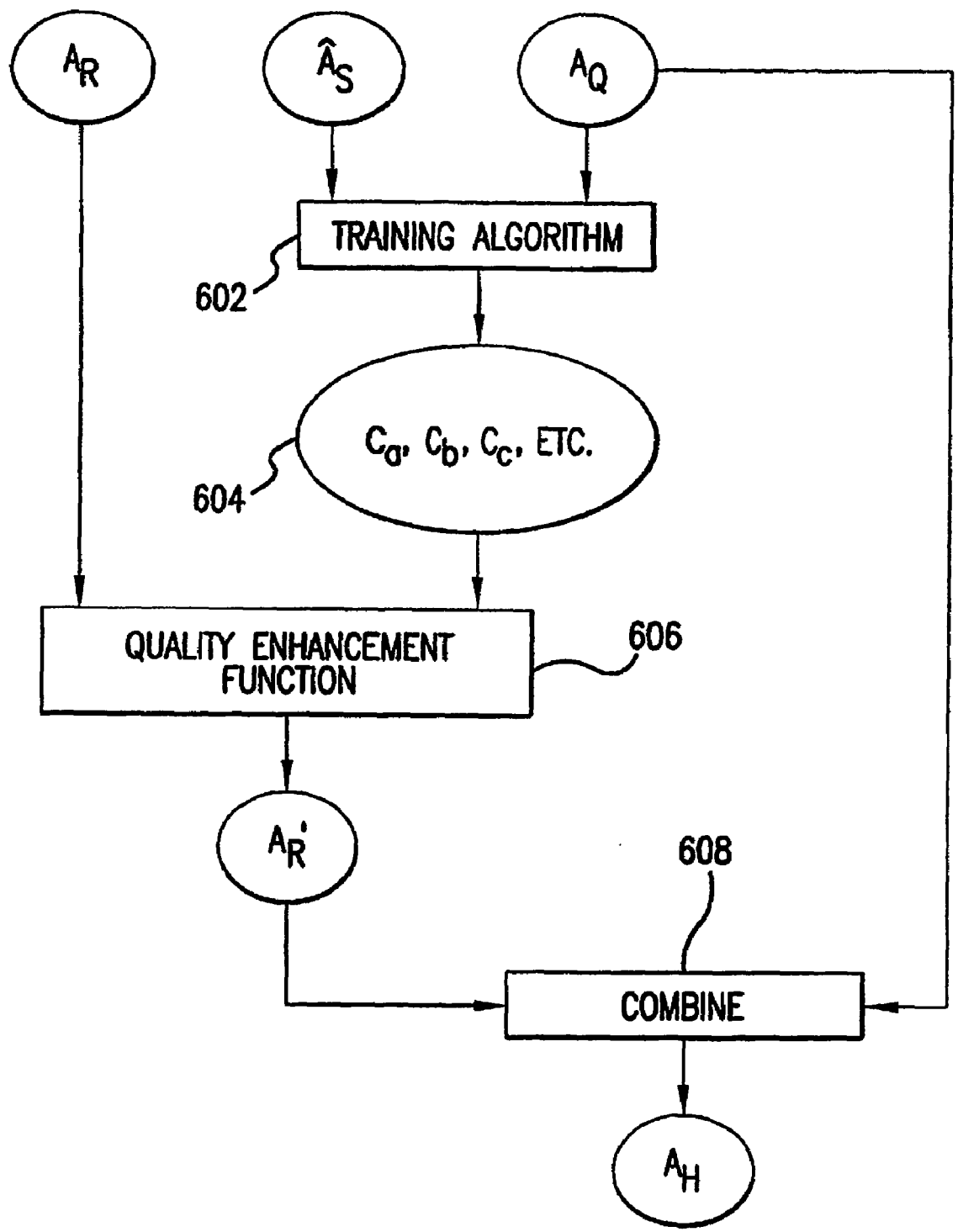
FIG. 6 is a block diagram illustrating an additional exemplary procedure for enhancing quality of sound data in accordance with the present invention.

A quality enhancement procedure in accordance with the present invention can also be used to enhance sound/audio data, as is illustrated in FIGS. 3, 5, and 6. In the illustrated procedure, a sound signal is detected to generate a set $A_S$ of low quality sound data (step 502). The low quality data set $A_S$ includes first and second portions $\hat{A}_S$ and $A_R$—e.g., data collected from time $t_1$ to time $t_2$, and data collected from time $t_2$ to time $t_3$. A set $A_Q$ of high quality sound data is generated by sampling the same sub-portion of the sound signal that is used to generate the first low quality data subset $\hat{A}_S$ (step 504). For example, the sound signal can be sampled at 22 kHz to derive the low quality data set $A_S$ (including subsets $\hat{A}_S$ and $A_R$) and at 44 kHz to generate the high quality sound data set $A_Q$. Alternatively, or in addition, the first subset $\hat{A}_S$ of the low quality data set $A_S$ can be derived by degrading the high quality data $A_Q$—e.g., by deleting one of every two samples. The quality of the sound data can also be defined by the signal level resolution—e.g., the number of bits per sample. For example, the low quality data can have 8 bits per sample and the high quality data can have 16 bits per sample.

In any case, the high resolution sound data $A_Q$ and the first subset of $\hat{A}_S$ of low resolution sound data are used as a training pair for a training algorithm 602 to derive optimized parameters 604 of a quality enhancement function 606 (step 506). For example, if the quality enhancement function 606 is a polynomial function, polynomial coefficients vectors $C_a$, $C_b$, $C_c$, etc. are derived by the training algorithm 602. In any case, once the learned parameters 604 of the quality enhancement function 606 have been determined, the quality enhancement function, with the learned parameters, is used to process the second subset $A_R$ of low quality sound data to derive high quality sound data $A_R'$ representing the remainder of the sound signal (step 508). The high quality sound data $A_R'$ thus derived can be combined with the high quality, sampled sound data $A_Q$ (step 608) to derive a complete set of high quality sound data $A_H$ representing the entire sound signal.

Figure 11:
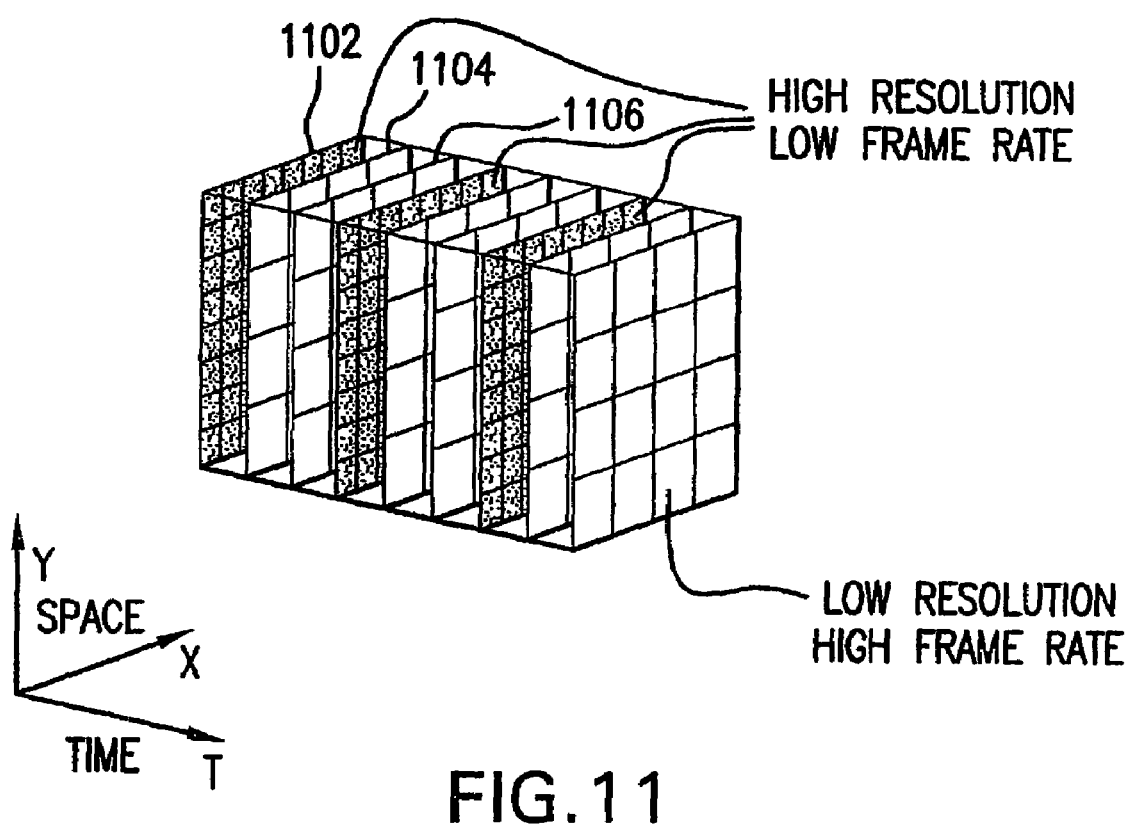
FIG. 11 is a diagram illustrating an exemplary video sequence to be processed in accordance with the present invention.
Figure 14:
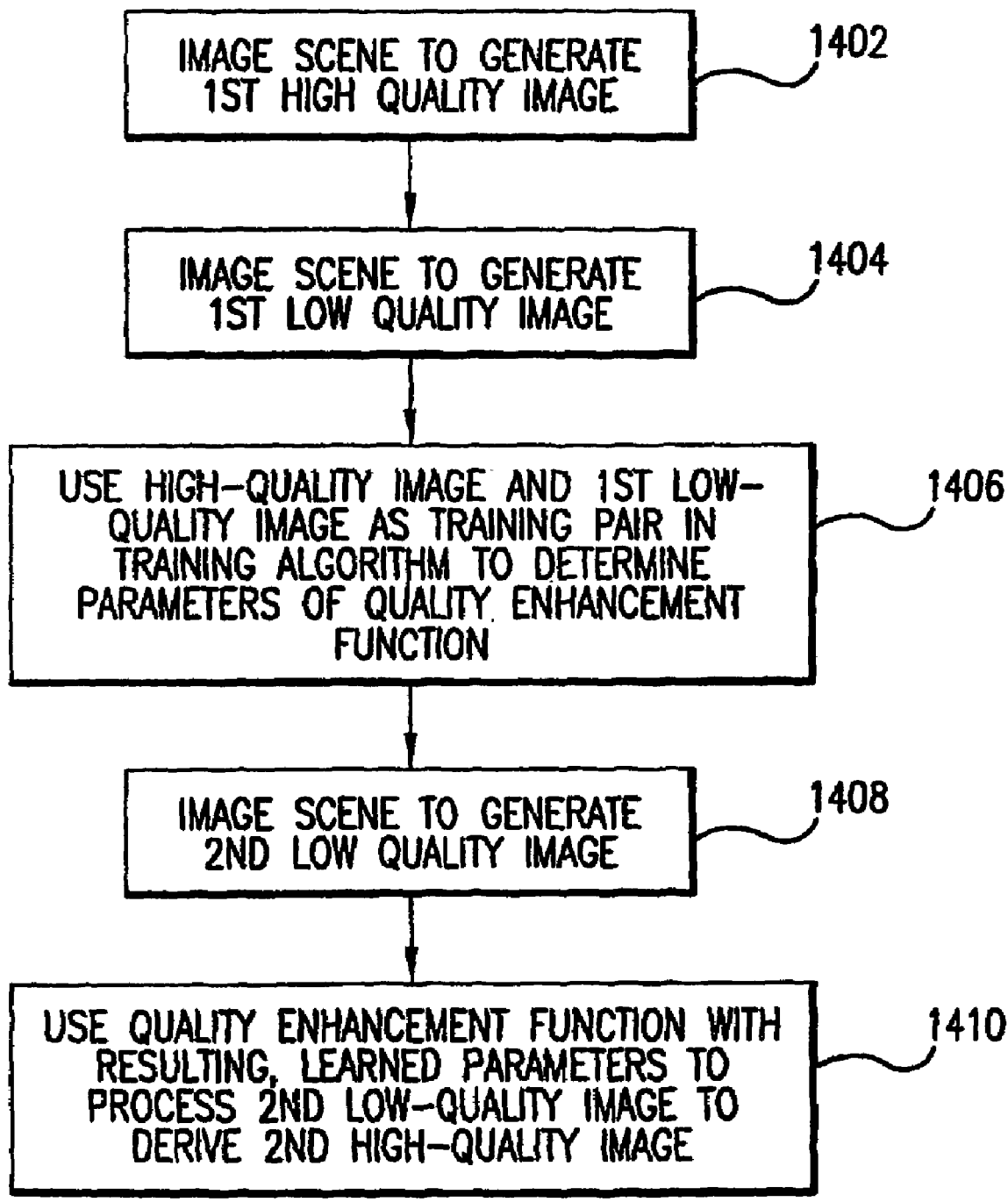
FIG. 14 is a diagram illustrating an exemplary system for enhancing quality of image data in accordance with the present invention.

In accordance with an additional aspect of the present invention, a quality enhancement function can be trained on a set of video frames having different amounts of quality—e.g., different spatial resolutions—as is illustrated in FIGS. 11 and 14. In the illustrated procedure, a scene is imaged to generate a first high quality image 1102 (e.g., a high quality video frame) (step 1402). The scene is imaged again to generate a first low quality image/video frame 1104 (step 1404). The high quality image 1102 and the first low quality image 1104 are used as a training pair in a training algorithm such as is discussed above to determine the parameters of a quality enhancement function (step 1406). When one or more additional low resolution frames (e.g., low quality image 1106) are generated (step 1408), the quality enhancement function can be used with the learned parameters to process the additional low quality images to derive an additional high quality images (step 1410). It is to be noted, however, that although FIG. 14 illustrates the above-described procedure as applying the training algorithm before the additional low quality images are captured, the training algorithm can just as easily be applied after all or most of the image data has been captured.

FIGS. 10A and 10C illustrate exemplary systems for generating image data for use in the procedure illustrated in FIG. 14. The system illustrated in FIG. 10A includes a high resolution video camera 1002, a low resolution video camera 1004, and a beam splitter 1006 to distribute the incoming light to the two cameras 1002 and 1004. Because the same incoming beam is imaged by both cameras 1002 and 1004, the system can be considered to have a single viewpoint 1014. Optionally, the high resolution camera 1002 can have a low frame rate, and the low resolution camera 1004 can have a high frame rate. For example, the high resolution camera 1002 can produce video data with a spatial resolution of 1000×1000 pixels and a frame rate of 3 frames per second, and the low resolution video camera 1004 can produce video data with a spatial resolution of 500×500 pixels and a frame rate of 30 frames per second.

Similarly to the system illustrated in FIG. 10A, the system illustrated in FIG. 10C includes a high resolution video camera 1002 and a low resolution video camera 1004. However the system illustrated in FIG. 10C does not include a beam splitter 1006. Rather, the two cameras 1002 and 1004 illustrated in FIG. 10C have different viewpoints 1012 and 1014, respectively. Preferably, the viewpoints 1012 and 1014 of the cameras 1002 and 1004 are proximate—in particular, the viewpoints 1012 and 1014 are preferably sufficiently close together compared to the depth of the scene being imaged that little or no parallax adjustment is required. The procedure illustrated in FIG. 14 is used to process the low resolution and high resolution images generated by the cameras 1002 and 1004 (the images having been generated in steps 1402 and 1404 illustrated in FIG. 14) to train the resolution enhancement function discussed above (step 1406), whereupon further low resolution images generated by the low resolution camera 1004 (step 1408) are enhanced by the optimized quality enhancement function to derive high quality images (step 1410). The viewpoint of the enhanced resolution images is typically equal or proximate to the viewpoint 1014 of the low resolution camera 1004 used to generate the low resolution images from which the enhanced resolution images are derived.

FIG. 10B illustrates a CCD array 1008 suitable for generating image data for use in the procedure illustrated in FIG. 14. The illustrated CCD array 1008 can be used to generate data at varying resolutions by clustering individual elements (e.g., into groups of 4 pixels) to form "super pixels" 1010. The 4 pixels in each super pixel 1010 can, for example, be clustered by averaging the values of the 4 pixels. Such clustering of pixels is advantageous because, although the spatial resolution of the devices is reduced, clustering allows the CCD array 1008 to sample at a higher frame rate. The pixels need not be clustered for every frame. The resolution of successive frames can be varied—for example, by capturing a sequence of nine low resolution images at a high frame rate, followed by one high resolution image. By using the high resolution image and one or more of the low resolution images to train a quality enhancement function, as is discussed above with respect to FIGS. 11 and 14, the low resolution images can be enhanced to derive high resolution images. As a result, the system is able to generate high resolution video at a high frame rate.

Figure 12:
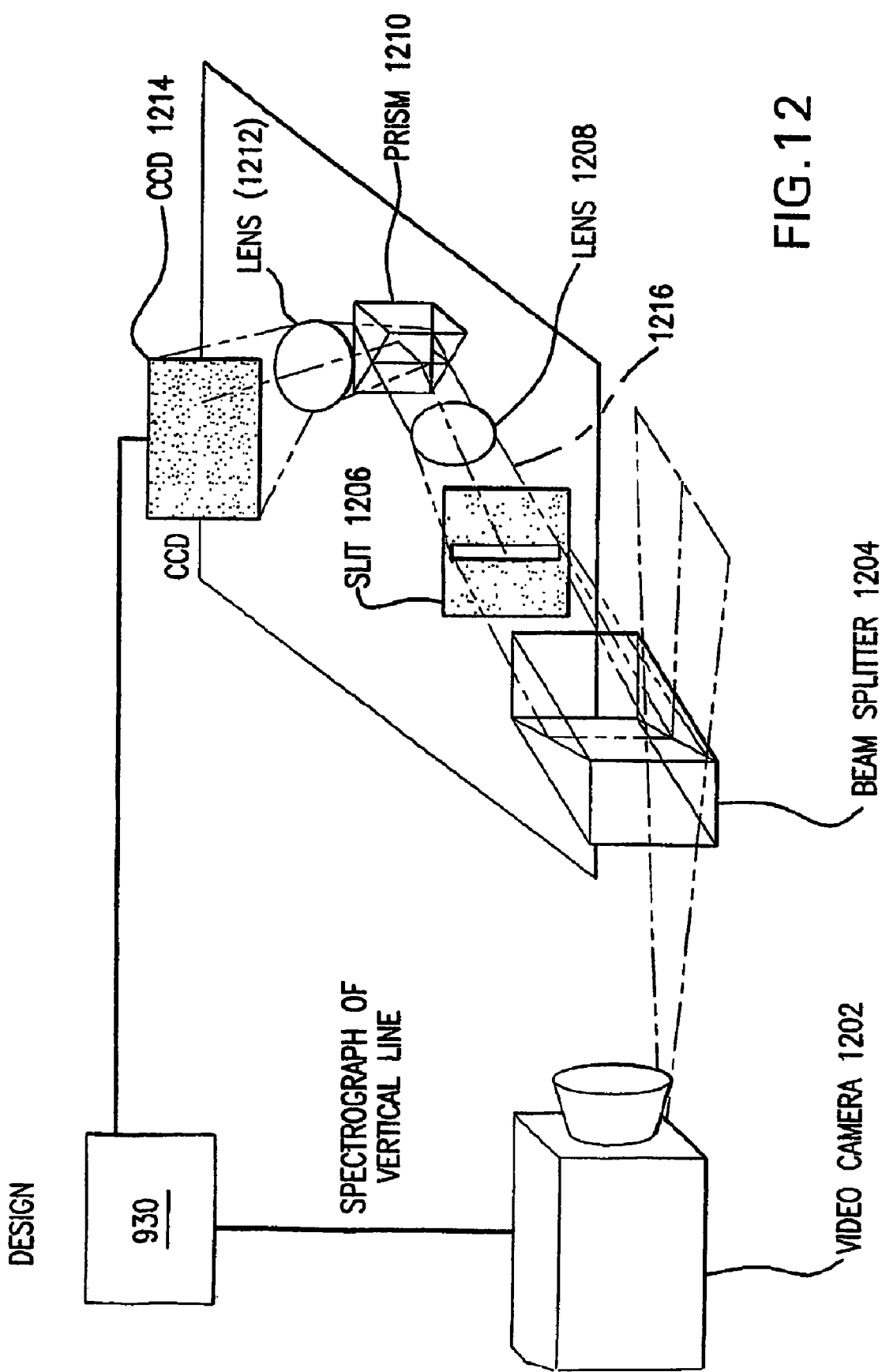
FIG. 12 is a diagram illustrating a system for generating image data in accordance with the present invention.

In accordance with the present invention, the spectral resolution of image data can also be enhanced. FIG. 12 illustrates a system for generating image data having portions with high spectral resolution and portions with low spectral resolution. The system includes a video camera 1202, a beam splitter 1204, a slit 1206, a first lens 1208, a prism 1210, a second lens 1212, and a CCD array 1214. The beam splitter 1204 passes some of the incoming light through to the video camera 1202 and redirects the remaining light toward the slit 1206, from which a narrow beam 1216 of light passes through the first lens 1208 and into the prism 1210. The prism 1210 directs the various spectral components of the beam in different directions. The components pass through the second lens 1212 and are received and detected by the CCD array 1214. The resulting output of the CCD array 1214 is a high spectral resolution measurement of the wavelengths present in the narrow beam of light 1216 passing through the slit 1206. Even if the video camera 1202 is a color video camera, such a camera typically provides only coarse red, green, and blue (RGB) information. In contrast, because the light received by the CCD array 1214 has passed through a slit 1206 and a prism 1210, the various wavelengths present in the light have been spread horizontally across the entire CCD array 1214. The resulting spectral information includes measurements of as many spectral components as the number of pixels across the horizontal dimension of the CCD array 1214. FIG. 13 illustrates exemplary video data generated by the system illustrated in FIG. 12. In each frame of the video data, there is a low quality (in this case, low spectral resolution) image $I_S$ which has been generated by the camera 1202 and which includes a first data subset $\hat{I}_S$ and a second data subset $I_R$. Also included is a high quality (in this case, high spectral resolution) data set $I_Q$ which has been generated by the CCD array 1214 and which represents the same portion of the scene as the first subset $\hat{I}_S$ of the low resolution data set $I_S$. Similarly to the image data $I_S$ and $I_Q$ illustrated in FIG. 1, the image data $I_S$ and $I_Q$ illustrated in FIG. 13 can be processed—e.g., by processing arrangement 930 illustrated in FIG. 12—according to the training and quality enhancement procedure illustrated in FIGS. 2 and 4 to derive an image representing the entire scene, but having a far greater amount of spectral information than is present in the low quality image $I_S$. Optionally, a video sequence of 1302—with each frame of the sequence 1302 including low spectral resolution data $I_S$ and high spectral resolution data $I_Q$—can be captured and enhanced to derive a video sequence representing the entire scene with high spectral resolution.

Figure 15:
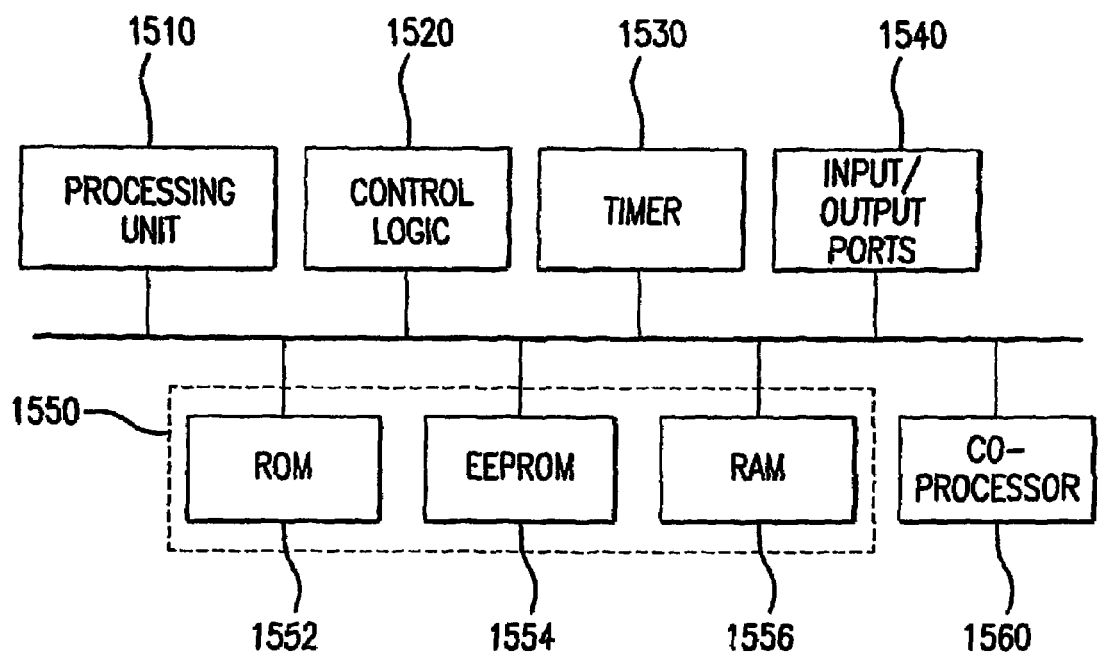
FIG. 15 is a block diagram illustrating an exemplary processing arrangement for use in the systems and procedures illustrated in FIGS. 1–14.

It will be appreciated by those skilled in the art that the methods and systems illustrated in FIGS. 1–14 can be implemented on various standard processing arrangements operating under the control of suitable software defined by FIGS. 1–8, 11, 13, and 14. FIG. 15 is a functional block diagram illustrating exemplary processing hardware 930 suitable for performing the methods of the present invention. Such a processing arrangement 930 can optionally be incorporated into one or more of the above-described imagers used to generate image data—as is illustrated in FIGS. 9B and 9C—or can be a separate device—as is illustrated in FIGS. 9A and 12. The illustrated arrangement 930 generally includes a processing unit 1510, control logic 1520, and a memory unit 1550. Preferably, the processing arrangement also includes a timer 1530 and input/output ports 1540. The arrangement can also include a co-processor 1560, depending on the microprocessor used in the processing unit 1510. Control logic 1520 provides, in conjunction with processing unit 1510, the control necessary to handle communications between memory unit 1550 and input/output ports 1540. Timer 1530 provides a timing reference signal for processing unit 1510 and control logic 1520. Co-processor 1560 provides an enhanced ability to perform complex computations in real time, such as those required by cryptographic algorithms.

Memory unit 1550 can include different types of memory, such as volatile and non-volatile memory and read-only and programmable memory. For example, as is illustrated in FIG. 15, memory unit 1550 can include read-only memory (ROM) 1552, electrically erasable programmable read-only memory (EEPROM) 1554, and random-access memory (RAM) 1556. Different processors, memory configurations, data structures and the like can be used to practice the present invention, and the invention is not limited to a specific platform.

Software defined by FIGS. 1–8, 11, 13, and 14 can be written in a wide variety of programming languages, as will be appreciated by those skilled in the art. For example, software algorithms in accordance with the present invention have been written in the programming language of the well known MATLAB® mathematics tool. The source code for exemplary algorithms written in the MATLAB® language is provided in Appendices A, B, and C attached hereto.

It is to be noted that although the foregoing descriptions of image enhancement have emphasized the imaging of scenes as viewed within the visible light spectrum, the disclosed techniques are applicable to imaging of any form of radiation, including, but not limited to, ultraviolet, infrared, X-ray, radar, ultrasound, etc.

Although the present invention has been described in connection with specific exemplary embodiments, it should be understood that various changes, substitutions, and alterations can be made to the disclosed embodiments without departing from the spirit and scope of the invention as set forth in the appended claims.

Appendix A

MATLAB® Source Code of Exemplary Algorithm for Computing Vector t of Degree-2 Monomials

```
% In this version the "t" function is computed
% but terms such as z1*z2 are ignored, only terms
% such as z1^2, z2^2, are considered. This
% improves efficiency although gives
% a less accurate approximation
function fsVect = nbhdToFS(a,nbhd,degree)
% No-cross terms
nV = nbhd(:);
nLen = prod(size(nV));
fsVect = zeros(nLen*degree,1);
fsVect(1:nLen) = nV;
for deg = 2:degree
    fsVect((((deg-1)*nLen)+1):(deg*nLen)) = ...
        nbhd(:).* ...
        fsVect((((deg-2)*nLen)+1):((deg-1)*nLen));
end
```

Appendix B

MATLAB® Source Code of Exemplary Learning/Training Algorithm

```
% This is matlab source code for learning
% the coefficients for enhancement
% polyLearnedModel constructor
function a = polyLearnedModel(fctr,nbhdSize,degree,1rSeq,hr,Seq)
a.null = '';
if 0 == nargin
    %Create a dummy model
    a.fctr = 0;
    a.nbhdSize = [1,1];
    a.degree = -1;
    a.params = [ ];
    b = enhancementModel('polyLearnedModel',[1,1]');
    a = class(a,'polyLearnedModel',b);
elseif 1 == nargin
    if isa(fctr,'polyLearnedModel')
        a = fctr;
    else
        errstr = [num2str(fctr), ...
            'Not polyLearnedModel object'];
        error(errstr);
    end
elseif 5 == nargin
    a.fctr = fctr;
    a.nbhdSize = nbhdSize;
    a.degree = degree;
    a.params = [ ];
    dummy = polyLearnedModel;
    params = interpKernel(fctr,nbhdSize,degree,1rSeq,hrSeq,dummy);
    b = enhancementModel('polyLearnedModel',params);
    a.params = params;
    a = class(a,'polyLearnedModel',b);
else
    error('Argument wrong type')
end
return
function kern Vals = ...
    interpKernel(fctr,nSize,degree,1rSeq,hrSeq,modl)
% A variable to allow for normalization and subtraction of the DC component
%DCSUB = 0;
epsilon = 2^(-26);
%epsilon = 0
1rSeqSize = size(1rSeq);
hrSeqSize = size(hrSeq);
if prod((fctr*1rSeqSize) == hrSeqSize) & (2 == length(1rSeqSize))
    ; % Ok
elseifprod((fctr*1rSeqSize(1:2)) == hrSeqSize(1:2)) & ...
        (length(1rSeqSize) <=3 )
    ; % Ok
else
    error('Images sequences improper sizes with respect to fctr')
end
% 'in polyLearnedModel Constructor fvSize'
fvSize = size(nbhdToFS(modl,zeros(nSize),degree));
featVectLen = prod(fvSize);
fvMat = zeros([featVectLen,featVectLen]);
outMat = zeros([featVectLen,fctr^2]);
inRows = 1:(1rSeqSize(1)-(nSize(1)+1))
```

-continued

```
inCols = 1:(1rSeqsize(2)-(nSize(2)+1));
nRad = floor((1/2)*nSize);
hrOffset = (fctr*(nRad-(~mod(nSize,2)))) + ...
    (~mod(nSize,2)).*[fctr/2,fctr/2]+1;
if (length(1rSeqSize) <3)
    numIms = 1;
elseif (3==length(1rSeqSize) )
    numIms = 1rSeqSize(3);
else
    error('Images sequences improper sizes')
end
for imInd = 1:numIms
    if (length(1rSeqSize) <3)
        1rIm = 1rSeq;
        hrIm = hrSeq;
    elseif (3==length(1rSeqSize))
        1rIm = 1rSeq(:,:,imInd);
        hrIm = hrSeq(:,:,imInd);
    end
    for inR = inRows
        for inC = inCols
            inN = getNbhd(inR,inC,1rIm,nSize);
            featVect =nbhdToFS(modl,inN,degree);
            fvMat = fvMat + featVect * featVect';
            out = fctr * [(inR-1),(inC-1)] + hrOffset;
            outN = getNbhd(out(1),out(2),hrIm,[fctr,fctr]);
            outMat = outMat + featVect*outN(:)';
        end
    end
end
'cond'
cond(fvMat)
'rank'
rank(fvMat)
'size'
size(fvMat)
if (abs(max(fvMat(:))) > epsilon) | ...
        (abs(min(fvMat(:))) > epsilon)
    % Solving Using SVD
    [U,S,V] = svd(fvMat);
    % We have to kill the eigenvalues that are really close to zero
    nz = (abs(S)>epsilon);
    invS = (ones(size(nz)).//(~nz)+S)).*nz;
    kernVals = V*invS*U*outMat;
else
    % Very singular fvMat
    kernVals = zeros(featVectLen,fctr^2);
end
return
% [",num2str( )]
function inNbhd = getNbhd(iR,iC,im,inNbhdSize)
    indsR = (iR-1)+(1:inNbhdSize(1));
    indsC = (iC-1)+(1:inNbhdSize(2));
    inNbhd = im(indsR,indsC);
    return
```

Appendix C

MATLAB® Source Code of Exemplary Algorithm for Enhancing Image Resolution Using Learned Coefficients

```
function newIm = improveImage(modl,im)
nSize = modl.nbhdSize;
imSize = size(im);
fctr = modl.fctr;
if (nSize(1) > imSize(1)) | (nSize(2) > imSize(2))
    error('Neighborhood larger than image.')
end
nbhdRad = floor((1/2)*nSize);
eImSize = fctr * (imSize - nSize+ones(size(nSize)));
newIm = zeros(eImSize);
```

-continued

```
nbhdsRow = 1:(imSize(1) - nSize(1)+1);
nbhdsCol = 1:(imSize(2) - nsize(2)+1);
nbhdRInds = 0:(nSize(1)-1);
nbhdCInds = 0:(nSize(2)-1);
for nR = nbhdsRow
    for nC = nbhdsCol
        nbhd=im(nR+nbhdRInds,nC+nbhdCInds);
        newValues = nbhdFunc(nbhd,mod1);
        newBlock = reshape(newValues,[fctr,fctr]);
        newIm(fctr*(nR-1)+(1:fctr), ...
            fctr*(nC-1)+(1:fctr)) = newBlock;
    end
end
return;
function newVals = nbhdFunc(nbhd,modl)
    %DCSUB = 0;
    nSize = size(nbhd);
    degree = get(modl,'degree');
    fsVect = nbhdToFS(modl,nbhd,degree);
    newVals = ((fsVect)*(modl.params))';
    return
```

We claim:

1. A method for enhancing data quality using a first data set, a second data set, and a quality enhancement function having at least one parameter, the first data set representing at least one of a scene and a signal, the second data set representing a first sub-portion of the at least one of the scene and the signal, the first data set having a first amount of quality, the second data set having a second amount of quality, the second amount of quality being greater than the first amount of quality, the first data set including first and second data subsets, the first data subset representing the first sub-portion of the at least one of the scene and the signal, the second data subset representing a second sub-portion of the at least one of the scene and the signal, each of the first and second data subsets having the first amount of quality, the method comprising:

processing the first data subset and the second data set by a training algorithm to determine a respective learned value of each one of the at least one parameter, wherein the quality enhancement function is operable to derive, based on the first data subset and using the respective learned value of each one of the at least one parameter, a data set approximating the second data set; and processing the second data subset by the quality enhancement function using the respective learned value of each one of the at least one parameter to derive a third data set, the third data set representing the second sub-portion of the at least one of the scene and the signal, the third data set having a third amount of quality, the third amount of quality being greater than the first amount of quality.

2. A method according to claim 1, wherein the first amount of quality comprises a first resolution, the second amount of quality comprising a second resolution, the third amount of quality comprising a third resolution.

3. A method according to claim 2, wherein the at least one of the scene and the signal comprises the scene, the first resolution comprising at least one of a first spatial resolution, a first intensity resolution, a first spectral resolution, and a first polarization resolution, the second resolution comprising at least one of a second spatial resolution, a second intensity resolution, a second spectral resolution, and a second polarization resolution, the third resolution comprising at least one of a third spatial resolution, a third intensity resolution, a third spectral resolution, and a third polarization resolution.

4. A method according to claim 2, wherein the first resolution comprises a first temporal resolution, the second resolution comprising a second temporal resolution, the third resolution comprising a third temporal resolution.

5. A method according to claim 2, wherein the at least one of the scene and the signal comprises the signal, the first resolution comprising at least one of a first signal level resolution and a first temporal resolution, the second resolution comprising at least one of a second signal level resolution and a second temporal resolution, the third resolution comprising at least one of a third signal level resolution and a third temporal resolution.

6. A method according to claim 1, wherein the first amount of quality comprises a first signal-to-noise ratio, the second amount of quality comprising a second signal-to-noise ratio, the third amount of quality comprising a third signal-to-noise ratio.

7. A method according to claim 1, wherein the first amount of quality comprises a first accuracy, the second amount of quality comprising a second accuracy, the third amount of quality comprising a third accuracy.

8. A method according the claim 1, wherein the quality enhancement function comprises a polynomial function, the at least one parameter comprising one or more coefficients of the polynomial function.

9. A method according to claim 8, wherein the training algorithm comprises determining a respective value of each of the one or more coefficients which minimizes a sum of square differences between the second data set and the data set approximating the second data set.

10. A method according to claim 1, wherein the training algorithm comprises determining a respective value of each one of the at least one parameter which minimizes a sum of square differences between the second data set and the data set approximating the second data set.

11. A method for enhancing data quality using a high quality image data set representing a scene, a first low quality image data set representing the scene, a second low quality image data set representing the scene, and a quality enhancement function having at least one parameter, an image corresponding to the high quality image data set having a first amount of quality, images corresponding to the first and second low quality image data sets having a second amount of quality, the first amount of quality being greater than the second amount of quality, the method comprising:
processing the high quality image data set and the first low quality image data set by a training algorithm to determine a respective learned value of each one of the at least one parameter, wherein the quality enhancement function is operable to derive, based on the first low quality image data set and using the respective learned value of each one of the at least one parameter, an image data set approximating the high quality image data set; and
processing the second low quality image data set by the quality enhancement function using the respective learned value of each one of the at least one parameter to derive a data set corresponding to an image having a third amount of quality, the third amount of quality being greater than the second amount of quality.

12. A method according to claim 11, wherein the first amount of quality comprises a first resolution, the second amount of quality comprising a second resolution, the third amount of quality comprising a third resolution.

13. A method according to claim 12, wherein the first resolution comprises at least one of a first spatial resolution, a first intensity resolution, a first spectral resolution, and a first polarization resolution, the second resolution comprising at least one of a second spatial resolution, a second intensity resolution, a second spectral resolution, and a second polarization resolution, the third resolution comprising at least one of a third spatial resolution, a third intensity resolution, a third spectral resolution, and a third polarization resolution.

14. A method according to claim 11, wherein the first amount of quality comprises a first signal-to-noise ratio, the second amount of quality comprising a second signal-to-noise ratio, the third amount of quality comprising a third signal-to-noise ratio.

15. A method according to claim 11, wherein the first amount of quality comprises a first accuracy, the second amount of quality comprising a second accuracy, the third amount of quality comprising a third accuracy.

16. A method according the claim 11, wherein the quality enhancement function comprises a polynomial function, the at least one parameter comprising one or more coefficients of the polynomial function.

17. A method according to claim 16, wherein the training algorithm comprises determining a respective value of each of the one or more coefficients which minimizes a sum of square differences between the high quality image data set and the image data set approximating the high quality image data set.

18. A method according to claim 11, wherein the training algorithm comprises determining a respective value of each one of the at least one parameter which minimizes a sum of square differences between the high quality image data set and the image data set approximating the high quality image data set.

19. A method according the claim 11, wherein the high quality image data set represents the scene as viewed from a first viewpoint, the first low quality image data set representing the scene as viewed from a second viewpoint, the second low quality image data set representing the scene as viewed from a third viewpoint, the second and third viewpoints being proximate to the first viewpoint.

20. A system for enhancing data quality using a first data set, a second data set, and a quality enhancement function having at least one parameter, the first data set representing at least one of a scene and a signal, the second data set representing a first sub-portion of the at least one of the scene and the signal, the first data set having a first amount of quality, the second data set having a second amount of quality, the second amount of quality being greater than the first amount of quality, the first data set including first and second data subsets, the first data subset representing the first sub-portion of the at least one of the scene and the signal, the second data subset representing a second sub-portion of the at least one of the scene and the signal, each of the first and second data subsets having the first amount of quality, the system comprising a processing arrangement configured to perform the steps of:
processing the first data subset and the second data set by a training algorithm to determine a respective learned value of each one of the at least one parameter, wherein the quality enhancement function is operable to derive, based on the first data subset and using the respective learned value of each one of the at least one parameter, a data set approximating the second data set; and
processing the second data subset by the quality enhancement function using the respective learned value of each one of the at least one parameter to derive a third data set, the third data set representing the second sub-portion of the at least one of the scene and the signal, the third data set having a third amount of quality, the third amount of quality being greater than the first amount of quality.

21. A system according to claim 20, wherein the first amount of quality comprises a first resolution, the second amount of quality comprising a second resolution, the third amount of quality comprising a third resolution.

22. A system according to claim 21, wherein the at least one of the scene and the signal comprises the scene, the first resolution comprising at least one of a first spatial resolution, a first intensity resolution, a first spectral resolution, and a first polarization resolution, the second resolution comprising at least one of a second spatial resolution, a second intensity resolution, a second spectral resolution, and a second polarization resolution, the third resolution comprising at least one of a third spatial resolution, a third intensity resolution, a third spectral resolution, and a third polarization resolution.

23. A system according to claim 21, wherein the first resolution comprises a first temporal resolution, the second resolution comprising a second temporal resolution, the third resolution comprising a third temporal resolution.

24. A system according to claim 21, wherein the at least one of the scene and the signal comprises the signal, the first resolution comprising at least one of a first signal level resolution and a first temporal resolution, the second resolution comprising at least one of a second signal level resolution and a second temporal resolution, the third resolution comprising at least one of a third signal level resolution and a third temporal resolution.

25. A system according to claim 20, wherein the first amount of quality comprises a first signal-to-noise ratio, the second amount of quality comprising a second signal-to-noise ratio, the third amount of quality comprising a third signal-to-noise ratio.

26. A system according to claim 20, wherein the first amount of quality comprises a first accuracy, the second amount of quality comprising a second accuracy, the third amount of quality comprising a third accuracy.

27. A system according the claim 20, wherein the quality enhancement function comprises a polynomial function, the at least one parameter comprising one or more coefficients of the polynomial function.

28. A system according to claim 27, wherein the training algorithm comprises determining a respective value of each of the one or more coefficients which minimizes a sum of square differences between the second data set and the data set approximating the second data set.

29. A system according to claim 20, wherein the training algorithm comprises determining a respective value of each one of the at least one parameter which minimizes a sum of square differences between the second data set and the data set approximating the second data set.

30. A system for enhancing data quality using a high quality image data set representing a scene, a first low quality image data set representing the scene, a second low quality image data set representing the scene, and a quality enhancement function having at least one parameter, an image corresponding to the high quality image data set having a first amount of quality, images corresponding to the first and second low quality image data sets having a second amount of quality, the first amount of quality being greater than the second amount of quality, the system comprising a processing arrangement configured to perform the steps of:

processing the high quality image data set and the first low quality image data set by a training algorithm to determine a respective learned value of each one of the at least one parameter, wherein the quality enhancement function is operable to derive, based on the first low quality image data set and using the respective learned value of each one of the at least one parameter, an image data set approximating the high quality image data set; and processing the second low quality image data set by the quality enhancement function using the respective learned value of each one of the at least one parameter to derive a data set corresponding to an image having a third amount of quality, the third amount of quality being greater than the second amount of quality.

31. A system according to claim 30, wherein the first amount of quality comprises a first resolution, the second amount of quality comprising a second resolution, the third amount of quality comprising a third resolution.

32. A system according to claim 31, wherein the first resolution comprises at least one of a first spatial resolution, a first intensity resolution, a first spectral resolution, and a first polarization resolution, the second resolution comprising at least one of a second spatial resolution, a second intensity resolution, a second spectral resolution, and a second polarization resolution, the third resolution comprising at least one of a third spatial resolution, a third intensity resolution, a third spectral resolution, and a third polarization resolution.

33. A system according to claim 30, wherein the first amount of quality comprises a first signal-to-noise ratio, the second amount of quality comprising a second signal-to-noise ratio, the third amount of quality comprising a third signal-to-noise ratio.

34. A system according to claim 30, wherein the first amount of quality comprises a first accuracy, the second amount of quality comprising a second accuracy, the third amount of quality comprising a third accuracy.

35. A system according the claim 30, wherein the quality enhancement function comprises a polynomial function, the at least one parameter comprising one or more coefficients of the polynomial function.

36. A system according to claim 35, wherein the training algorithm comprises determining a respective value of each of the one or more coefficients which minimizes a sum of square differences between the high quality image data set and the image data set approximating the high quality image data set.

37. A system according to claim 30, wherein the training algorithm comprises determining a respective value of each one of the at least one parameter which minimizes a sum of square differences between the high quality image data set and the image data set approximating the high quality image data set.

38. A system according the claim 30, wherein the high quality image data set represents the scene as viewed from a first viewpoint, the first low quality image data set representing the scene as viewed from a second viewpoint, the second low quality image data set representing the scene as viewed from a third viewpoint, the second and third viewpoints being proximate to the first viewpoint.

* * * * *